(12) United States Patent
Jozuka et al.

(10) Patent No.: US 10,550,298 B2
(45) Date of Patent: Feb. 4, 2020

(54) PRESSURE-SENSITIVE ADHESIVE SHEET FOR PORTABLE ELECTRONICS

(71) Applicant: NITTO DENKO CORPORATION, Ibaraki-shi, Osaka (JP)

(72) Inventors: Kenta Jozuka, Ibaraki (JP); Naoki Nakayama, Ibaraki (JP); Yoshikazu Soeda, Ibaraki (JP); Yasushi Buzojima, Ibaraki (JP); Naoaki Higuchi, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 125 days.

(21) Appl. No.: 15/327,408

(22) PCT Filed: Jul. 14, 2015

(86) PCT No.: PCT/JP2015/070095
§ 371 (c)(1),
(2) Date: Jan. 19, 2017

(87) PCT Pub. No.: WO2016/013442
PCT Pub. Date: Jan. 28, 2016

(65) Prior Publication Data
US 2017/0158918 A1    Jun. 8, 2017

(30) Foreign Application Priority Data

Jul. 23, 2014 (JP) .................................. 2014-150044
Jul. 10, 2015 (JP) .................................. 2015-139002

(51) Int. Cl.
*C09J 7/22* (2018.01)
*C09J 7/38* (2018.01)
(Continued)

(52) U.S. Cl.
CPC .............. *C09J 133/08* (2013.01); *C08L 93/00* (2013.01); *C09J 7/22* (2018.01); *C09J 7/38* (2018.01);
(Continued)

(58) Field of Classification Search
CPC ..... C09J 133/08; C09J 7/38; C09J 7/22; C09J 2201/622; C09J 133/06; C09J 133/10;
(Continued)

(56) References Cited

U.S. PATENT DOCUMENTS 4,087,392 A * 5/1978 Hartmann .......... C08G 18/8093
524/270
5,423,783 A * 6/1995 Battles .................... D04H 1/54
604/344
(Continued)

FOREIGN PATENT DOCUMENTS

| CN | 100402007 C | 7/2008 |
|---|---|---|
| CN | 102015944 A | 4/2011 |

(Continued)

OTHER PUBLICATIONS

ASAPRENE 411 Datasheet from Asahi Kasei Chemicals Corp., available at https://www.akelastomer.com/eng/products/asaprene/asaprene_t411.html (Year: 2018).*
(Continued)

*Primary Examiner* — Scott R. Walshon
(74) *Attorney, Agent, or Firm* — Sughrue Mion, PLLC

(57) ABSTRACT

Provided is a PSA sheet that provides highly reliable adhesion and great stretch removability from adherends. This invention provides a PSA sheet. The PSA sheet exhibits a shear adhesive strength of 0.5 MPa or greater, a tensile strength at break of 10 MPa or greater, and an elongation at break of 300% or greater.

18 Claims, 3 Drawing Sheets

(51) Int. Cl.
*C09J 133/08* (2006.01)
*C09J 201/00* (2006.01)
*C09J 133/06* (2006.01)
*C08L 93/00* (2006.01)

(52) U.S. Cl.
CPC .......... *C09J 133/06* (2013.01); *C09J 201/00* (2013.01); *C09J 2201/128* (2013.01); *C09J 2201/622* (2013.01); *C09J 2203/33* (2013.01); *C09J 2433/00* (2013.01); *C09J 2475/006* (2013.01)

(58) Field of Classification Search
CPC ............ C09J 2201/128; C09J 2475/006; C09J 2433/00; C09J 2203/33; C08L 93/00
See application file for complete search history.

(56) References Cited

U.S. PATENT DOCUMENTS

| | | | | |
|---|---|---|---|---|
| 6,107,219 A * | 8/2000 | Joseph | ................. | A61F 13/023 428/343 |
| 6,133,173 A * | 10/2000 | Riedel | ................. | A61F 13/0273 442/151 |
| 7,078,582 B2 * | 7/2006 | Stebbings | ............... | A61L 15/24 602/54 |
| 9,624,404 B2 * | 4/2017 | Jozuka | ....................... | C09J 7/30 |
| 2003/0175497 A1 * | 9/2003 | Kobe | ........................ | C09J 7/26 428/317.9 |
| 2007/0077418 A1 * | 4/2007 | Sakurai | .................. | B32B 27/08 428/343 |
| 2008/0248299 A1 * | 10/2008 | Kuwahara | ............. | C09J 133/04 428/355 R |
| 2012/0301660 A1 * | 11/2012 | Bartusiak | ................. | B32B 5/02 428/99 |
| 2014/0044915 A1 | 2/2014 | Niwa et al. | | |

FOREIGN PATENT DOCUMENTS

| | | |
|---|---|---|
| EP | 0 563 272 B1 | 2/1997 |
| JP | 06-503848 A | 4/1994 |
| JP | 06-504077 A | 5/1994 |
| JP | 06-346032 A | 12/1994 |
| JP | 2005-500133 A | 1/2005 |
| JP | 2011-514419 A | 5/2011 |
| JP | 2012-514119 | 6/2012 |
| JP | 2014-051644 A | 3/2014 |
| JP | 2015-124289 A | 7/2015 |
| JP | 2015-163690 A | 9/2015 |
| WO | 92/11332 A1 | 7/1992 |
| WO | 92/11333 A1 | 7/1992 |
| WO | 03/017899 A2 | 3/2003 |
| WO | 2009/151686 A2 | 12/2009 |
| WO | 2010/078346 A1 | 7/2010 |

OTHER PUBLICATIONS

International Search Report of PCT/JP2015/070095 dated Oct. 13, 2015 [PCT/ISA/210].
First Notification of Reasons for Refusal dated May 20, 2019, from the State Intellectual Property Office of People's Republic of China in counterpart Application No. 201580040990.4.
Notice of Reasons for Refusal dated Jul. 4, 2019, from the Japanese Patent Office in counterpart application No. 2015-139002.
Notice of Reasons for Refusal dated Nov. 14, 2019 issued by the Japanese Patent Office Action in JP Application No. 2015-139002.

* cited by examiner

[Fig. 1]
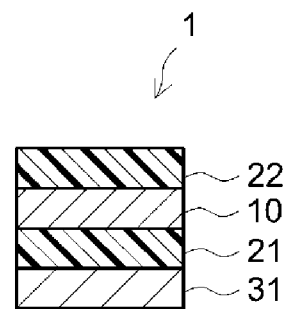
[Fig. 2]
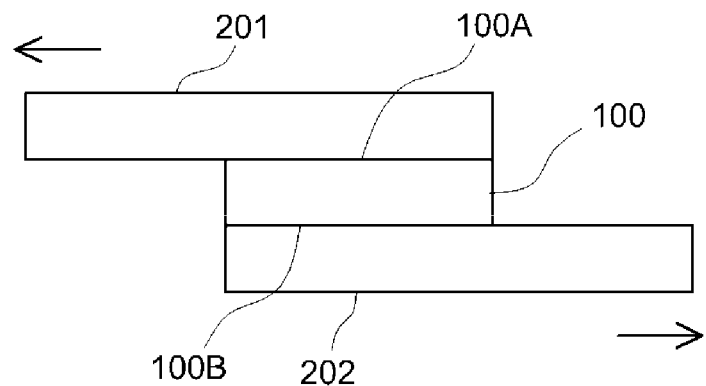

[Fig. 3(a)]
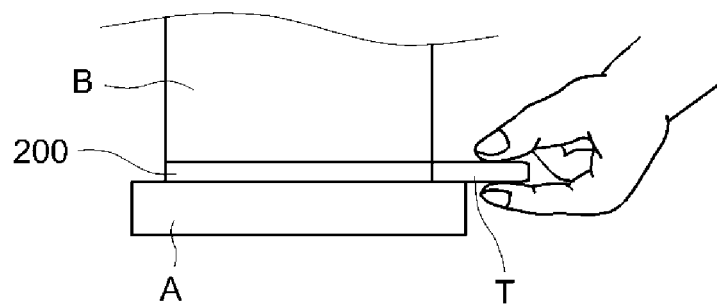
[Fig. 3(b)]
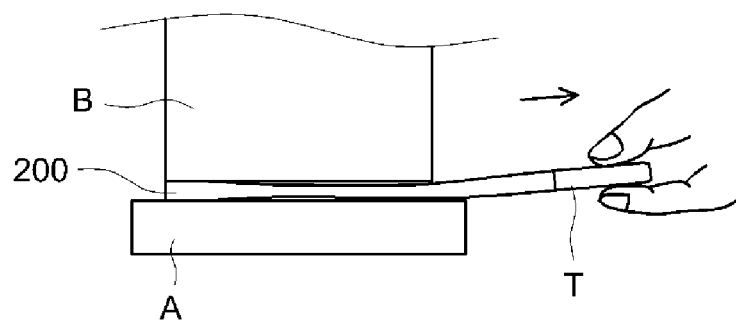
[Fig. 3(c)]
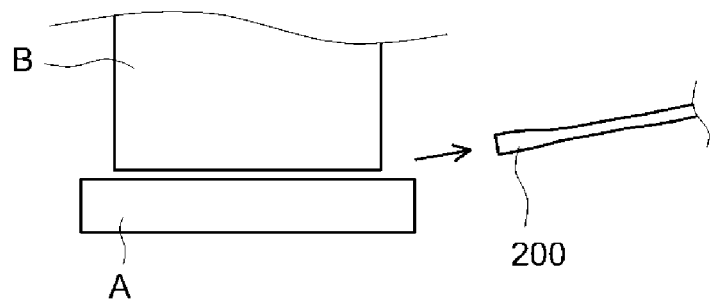

[Fig. 4(a)]
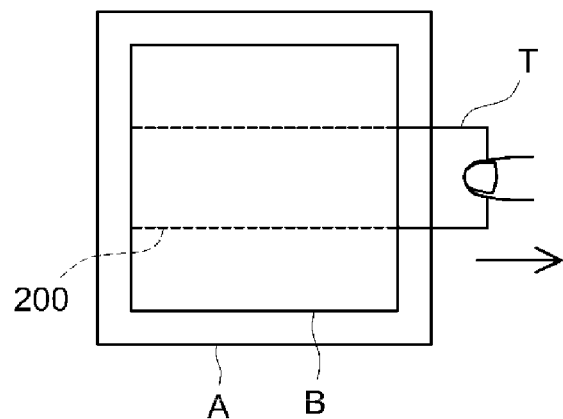
[Fig. 4(b)]
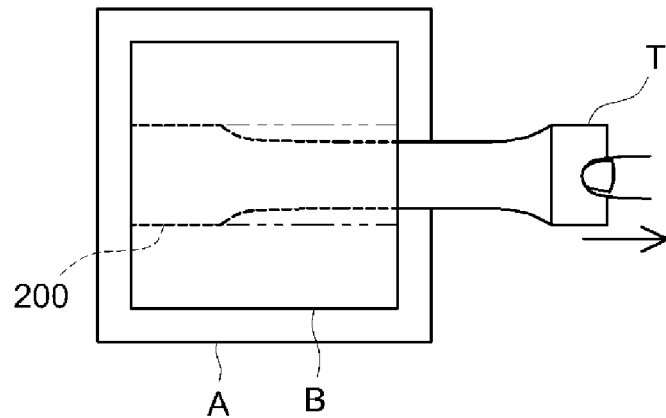
[Fig. 4(c)]
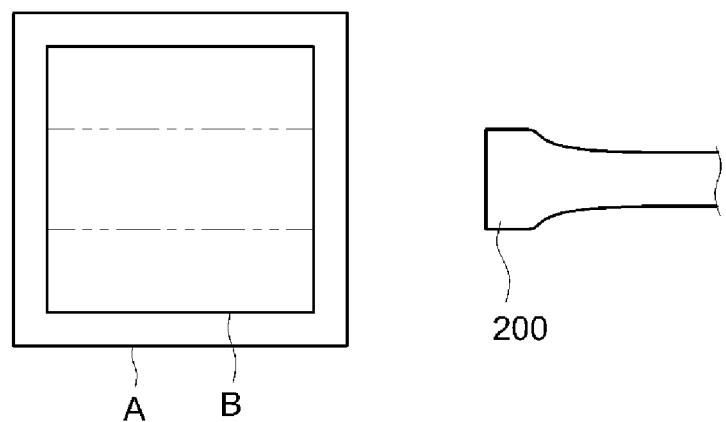

PRESSURE-SENSITIVE ADHESIVE SHEET FOR PORTABLE ELECTRONICS

CROSS REFERENCE TO RELATED APPLICATIONS

This application is a National Stage of International Application No. PCT/JP2015/070095, filed Jul. 14, 2015, claiming priorities based on Japanese Patent Application Nos. 2014-150044, filed Jul. 23, 2014 and 2015-139002, filed Jul. 10, 2015, the contents of all of which are incorporated herein by reference in their entirety.

TECHNICAL FIELD

The present invention relates to a pressure-sensitive adhesive sheet used in portable electronics.

BACKGROUND ART

In general, pressure-sensitive adhesive (or PSA; the same applies hereinafter) has characteristics to be in a soft solid (viscoelastic) state in a room temperature range and adhere to adherend under some pressure. With the benefit of such properties, PSA has been preferably used in PSA sheet forms, for fixing components in portable electronics such as mobile phones, smartphones, and tablet PCs. It is also preferably used as PSA sheets that are applied, but removed afterwards. References disclosing this type of conventional art include Patent Documents 1 and 2. Both Patent Documents 1 and 2 disclose conventional art having extendable substrates. Patent Document 2 relates to a medical PSA sheet applied to the skin.

CITATION LIST

Patent Literature

[Patent Document 1] Japanese Patent Application Publication No. H6-346032
[Patent Document 2] Japanese Patent Application Publication No. 2005-500133

SUMMARY OF INVENTION

Technical Problem

PSA sheets used as means for, for instance, fastening components of portable electronics are required to be unsusceptible to the occurrence of adhesion defects such as peeling and displacement. To produce such highly reliable adhesion, PSA sheets used for this application are usually designed to have relatively high adhesive strength. On the other hand, PSA sheets adhered to adherends may be removed therefrom during repair, replacement, inspection, recycling, etc. of the components. Some adherends are susceptible to deformation. Thus, in addition to being able to provide highly reliable adhesion, PSA sheets for this application are desirably constructed to be removable without causing deformation or damage to the adherends. In particular, for instance, it is preferable to adopt a construction where the PSA sheet has an area exposed to the outside so that it can be pulled by the exposed area for removal from the adherend surface. However, a highly adhesive PSA sheet may not withstand the pulling during the removal, possibly leading to damage such as tearing of the sheet. It will be beneficial to provide a PSA sheet that provides highly reliable adhesion and great stretch removability from adherends.

This invention has been made in view of the circumstances described above with an objective to provide a PSA sheet that provides highly reliable adhesion and great stretch removability from adherends.

Solution to Problem

The present invention provides a PSA sheet for portable electronics. The PSA sheet exhibits a shear adhesive strength of 0.5 MPa or greater, a tensile strength at break of 10 MPa or greater, and an elongation at break of 300% or greater. In a typical embodiment, the PSA sheet for portable electronics comprises a PSA layer and a film substrate supporting the PSA layer. The PSA sheet exhibits a shear adhesive strength of 0.5 MPa or greater, a tensile strength at break of 10 MPa or greater, and an elongation at break of 300% or greater.

According to such an embodiment, because the PSA sheet exhibits a shear adhesive strength of at least the prescribed value, it may serve as a highly reliable bonding means. While showing at least the prescribed shear adhesive strength value as described above, the PSA sheet is less susceptible to the occurrence of damage such as tearing because it also exhibits a tensile strength at break of at least the prescribed value. The PSA sheet in this embodiment has an elongation at break of at least the prescribed value. Thus, it stretches when pulled during the PSA sheet removal. Because of the elongation, the PSA sheet is deformed and removed from the adherend. With such reciprocal effects between the pulling and the PSA sheet deformation, the PSA sheet can be removed adequately from the adherend. The PSA sheet satisfying these properties is preferable also in view of preventing adherend deformation during removal. In summary, the PSA sheet disclosed herein shows great removability by pulling (stretch removability). In particular, the PSA sheet shows excellent removability (shear removability) when pulled at an angle (typically at an angle of $-90°$ to $90°$, e.g. $0°$ or larger, and smaller than $90°$) that acts in the shear direction relative to the adhesion face.

In a preferable embodiment, the PSA sheet disclosed herein shows a tensile recovery of 80% or higher when measured by the method described below.

[Measurement of Tensile Recovery]

A PSA sheet is subjected to a tensile test in which a designated segment of a length $L_0$ in the PSA sheet is stretched by 100%. After stretched by 100%, the PSA sheet is released. When the designated segment has a length $L_1$ at five minutes after released, the tensile recovery is determined by an equation: tensile recovery $(\%) = L_0/L_1 \times 100$.

With a PSA sheet that satisfies this property, damage such as tearing can be greatly prevented during removal of the PSA sheet. For instance, when a PSA sheet is subjected to removal by pulling (stretch removal) in the shear direction, a certain amount of time is usually required depending on the area of adhesion, etc. Thus, the removal working can be interrupted midway. In such a case, if the tensile recovery of the PSA sheet is at or below a certain value, the pulling up to the work interruption lowers the mechanical properties (strength, elasticity, etc.) and the removal work is to be resumed from this state. In such a case, the PSA sheet may not be able to resist the pulling when the removal work is resumed, likely suffering damage such as fracture, etc. With respect to a PSA sheet exhibiting the aforementioned tensile recovery, even in a case where it is removed in an embodiment including an interruption as described above, the recovery after the pulling reduces the lowering of the mechanical properties, possibly leading to greater prevention of damage.

In a preferable embodiment of the PSA sheet disclosed herein, the film-like substrate is a non-foam resin film substrate. The use of the non-foam resin film substrate can preferably bring about excellent stretch removability (especially shear removability).

In a preferable embodiment, the PSA sheet disclosed herein comprises, as the PSA layer, a first PSA layer placed on a first face of the film-like substrate and a second PSA layer placed on a second face of the film-like substrate. Such a substrate-supported, adhesively double-faced PSA sheet can be preferably used as a highly reliable fastening means (typically joining means for two adherends).

The PSA sheet disclosed herein can be preferably used in an embodiment where it is used to join two adherends and removed from the two adherends in a way that it is pulled out of the interface between the two adherends. More specifically, the PSA sheet can be used to join two adherends and preferably removed from the two adherends in a way that, with the two adherends being in a joined state, it is pulled out of the interface between the two adherends. In addition, the PSA sheet disclosed herein is used to join two adherends and allows for preferable release from adhesion to the two adherends when, with the two adherends being in a joined state, the PSA sheet located between the two adherends is pulled. When two adherends are in a joined state, by pulling the PSA sheet disclosed herein at an angle to cause the force to act in a shear direction, the PSA sheet can be pulled out of the two adherends and removed without deformation of the adherend and tearing of the PSA sheet.

The PSA sheet disclosed herein provides highly reliable adhesion and great stretch removability from adherends. With the benefit of these features, it is particularly preferably used as a battery-fastening PSA sheet which is required to provide highly reliable adhesion for the fastening purpose and is often removed during repair, replacement and inspection of parts, etc. The art disclosed herein provides a PSA sheet favorably used for fastening a battery.

BRIEF DESCRIPTION OF DRAWINGS

FIG. 1 shows a cross-sectional view schematically illustrating an embodiment of the PSA sheet.

FIG. 2 shows an explanatory drawing schematically illustrating the measurement method for shear adhesive strength.

FIGS. 3(a)-(c) show schematic side views illustrating an embodiment of stretch removal.

FIGS. 4(a)-(c) show schematic top views illustrating an embodiment of stretch removal.

DESCRIPTION OF EMBODIMENTS

Preferred embodiments of the present invention are described below. Matters necessary to practice this invention other than those specifically referred to in this description can be understood by a person skilled in the art based on the disclosure about implementing the invention in this description and common technical knowledge at the time the application was filed. The present invention can be practiced based on the contents disclosed in this description and common technical knowledge in the subject field. The embodiments described in the drawings are schematized for clear illustration of the present invention, and do not necessarily represent the accurate sizes or reduction scales of the PSA sheet to be provided as an actual product by the present invention.

The term "PSA" in this description refers to, as described earlier, a material that exists as a soft solid (a viscoelastic material) in a room temperature range and has a property to adhere easily to adherend with some pressure applied. As defined in "*Adhesion: Fundamental and Practice*" by C. A. Dahlquist (McLaren & Sons (1966), P. 143), PSA referred to herein is generally a material that has a property satisfying complex tensile modulus $E^*$ (1 Hz)$<10^7$ dyne/cm$^2$ (typically, a material that exhibits the described characteristics at 25° C.).

<Constitution of PSA Sheet>

The PSA sheet disclosed herein is an on-substrate PSA sheet typically having a PSA layer on at least one face (preferably each face) of a film-like substrate (support). The concept of PSA sheet herein encompasses so-called PSA tapes, PSA labels, PSA films and the like. The PSA sheet disclosed herein may be in a rolled form or in a flat sheet form. Alternatively, the PSA sheet may be processed into various other shapes. The PSA sheet may be free of a film-like substrate as well.

The PSA sheet disclosed herein may have, for instance, the cross-sectional structure schematically illustrated in FIG. 1. PSA sheet 1 shown in FIG. 1 has a constitution where it is provided with PSA layers 21 and 22 on the respective faces (both non-releasable) of a film-like substrate 10, with one of them, PSA layer 21, being protected with a release liner 31 having a release face on each side. PSA sheet 1 of this type can be wound to bring the other PSA layer 22 in contact with the back face of release liner 31 to protect the PSA layer 22 with release liner 31 as well. Alternatively, the PSA sheet may have a constitution where the PSA layers are protected with two release liners each having a release face at least on the PSA layer side, respectively. Although not particularly illustrated in a drawing, the PSA sheet disclosed herein may also be a substrate-free double-faced PSA sheet consisting of a PSA layer.

From the standpoint of the stretch removability, the PSA sheet preferably has a long section. With this, when the PSA sheet is applied to an adherend, by gripping and pulling one length-direction end of the long section, the PSA sheet can be preferably stretch-removed from the adherend. In a more preferable embodiment, the PSA sheet is typically formed as a long piece. From the standpoint of the efficiency or workability of stretch removal, the PSA sheet preferably has a tab at one end in the length direction. While the shape of the tab is not particularly limited, it preferably has a shape (e.g. a rectangular shape) that can be held with fingers.

<Properties of PSA Sheet>

The PSA sheet disclosed herein is characterized by exhibiting a shear adhesive strength of 0.5 MPa or greater. By this, the PSA sheet is bonded well to an adherend. A PSA sheet exhibiting such adhesive strength may show great stress to a force to cause sliding at the adhesive interface (i.e. a shear force) and thus may serve as a highly reliable adhesion means in an application exposed to such shear force. The shear adhesive strength is preferably 0.8 MPa or greater (e.g. 1.0 MPa or greater, typically 1.2 MPa or greater). Although the upper limit of shear adhesive strength is not particularly limited, it is preferably 5 MPa or less (e.g. 3 MPa or less, typically 1.5 MPa or less) since the stretch removability and adhesive transfer resistance tend to decrease when the shear adhesive strength is excessively high.

The shear adhesive strength can be measured by the method described next. A PSA sheet (typically a double-faced PSA sheet) is cut to 20 mm by 20 mm in size to fabricate a measurement sample. In an environment at 23° C. and 50% RH, the respective adhesive faces of the measurement sample are overlaid on and press-bonded to surfaces of two stainless steel plates with a 2 kg roller moved back and forth once. The resultant is left standing for 30 minutes in the same environment. Subsequently, using a tensile tester, shear adhesive strength (MPa) is measured at a tensile rate of 300 mm/min at a peel angle of 0°. Specifically, as shown in FIG. 2, the first and second adhesive face 100A and 100B of measurement sample 100 are overlaid on and press-bonded to stainless steel plates 201 and 202, respectively. This is pulled at the aforementioned rate in the arrow direction (i.e. shear direction) in FIG. 2 and measured for peel strength per 20 mm by 20 mm. From the resulting value, the shear adhesive strength (MPa) is determined. As for an adhesively single-faced PSA sheet (single-faced PSA sheet), the non-adhesive face of the sheet is fastened via an adhesive, etc., to a stainless steel plate and a measurement can be made otherwise in the same way as the above. As the tensile tester, can be used a universal tensile/compression tester (product name "TG-1kN" available from Minebea Co., Ltd.). The same method is used in Examples described later.

The PSA sheet disclosed herein is characterized by exhibiting a tensile strength at break of 10 MPa or greater. In an embodiment with at least a certain level of adhesive strength, this may make the construction less susceptible to the occurrence of damage such as tearing during removal of the PSA sheet. It tends to lead to excellent workability as well. The tensile strength at break is preferably 20 MPa or greater, more preferably 30 MPa or greater (e.g. 45 MPa or greater, typically 60 MPa or greater). When the tensile strength at break is excessively high, the elasticity and stretchability of the film-like substrate tend to decrease. From such a viewpoint, the tensile strength at break is preferably about 100 MPa or less (e.g. 80 MPa or less, typically 70 MPa or less).

The tensile strength at break is measured based on the measurement method for "Tensile Strength" described in JIS K 7311:1995. More specifically, using a test piece in the Dumbbell No. 3 shape (width 5 mm), the tensile strength at break can be measured at a tensile speed of 300 mm/min. As the tensile tester, product name "Autograph AG-10G Tensile Tester" available from Shimadzu Corporation can be used. For the test, some powder is preferably applied to the adhesive face to eliminate the influence of the PSA's tack. The same method is used in Examples described later. The tensile direction in the test is not particularly limited. When the PSA sheet is a long piece, it is preferably in its length direction.

In a preferable embodiment, the PSA sheet has a tensile strength (MPa) at break at least five times (e.g. at least 10 times, typically at least 30 times) the shear adhesive strength (MPa). This may more assuredly prevent damage such as fracture during stretch removal of the PSA sheet.

The PSA sheet disclosed herein is characterized by exhibiting an elongation at break of 300% or greater. This brings about reciprocal effects between the pulling and the PSA sheet deformation to bring about excellent stretch removability (especially shear removability). The elongation at break is more preferably 500% or greater (e.g. 700% or greater, typically 800% or greater). The upper limit of the elongation at break is not particularly limited. From the standpoint of the workability for removal, it can be, for instance, about 1000% or less (typically 900% or less).

The elongation at break is measured based on the measurement method for "Elongation" described in JIS K 7311: 1995. More specifically, using a test piece in the Dumbbell No. 3 shape (width 5 mm, gage length 20 mm), the elongation at break can be measured at a tensile speed of 300 mm/min. The tensile tester and other conditions are basically the same as for the tensile strength at break described earlier. The same method is used in Examples described later. The tensile direction in the test is not particularly limited. When the PSA sheet is a long piece, it is preferably in its length direction.

The PSA sheet disclosed herein preferably shows a 100% modulus of less than 10 MPa. When the 100% modulus of the PSA sheet is less than the prescribed value, in pulling the PSA sheet to cause tensile deformation for its removal from the adherend, the initial resistance during the pulling tends to be smaller, leading to excellent stretch removability. The 100% modulus is more preferably less than 5 MPa. The lower limit of the 100% modulus is not particularly limited. From the standpoint of the ease of application of the PSA sheet, it is usually suitably 0.5 MPa or greater (e.g. 1 MPa or greater). The 100% modulus can be measured based on the measurement method for "Tensile Stress" described in JIS K 7311:1995. More specifically, a test piece in the Dumbbell No. 3 shape (width 5 mm, gage length 20 mm) is pulled at a tensile speed of 300 mm/min; when the gage distance is stretched by 100%, the resulting stress (MPa) is recorded as the 100% modulus. As the tensile tester, product name "Autograph AG-10G Tensile Tester" available from Shimadzu Corporation can be used. The same method is used in Examples described later. The 100% modulus of the PSA sheet can be adjusted, for instance, by selection of the substrate material species (selection of the hard component to soft component ratio, etc.), molding method, and so on.

The PSA sheet disclosed herein suitably exhibits a tensile recovery greater than 50%. The tensile recovery is preferably 70% or higher. The tensile recovery is more preferably 80% or higher (e.g. 90% or higher, typically 93% to 100%). This may bring about greater prevention of damage such as tearing, etc., during PSA sheet removal.

The tensile recovery is measured by the method described earlier. More specifically, based on JIS K 7311:1995, a test piece of Dumbbell No. 3 shape (width 5 mm, gage length 20 mm) is stretched by 100% at a tensile rate of 300 mm/min. In other words, the test piece is stretched until the gage length is extended by 20 mm. At five minutes after released from the stretched state, the length $L_1$ (gage length in mm) is measured and the tensile recovery is determined by the equation: tensile recovery (%)=$L_0/L_1 \times 100$. In this method, $L_0$ is the initial gage length of 20 mm. The tensile tester and other conditions are basically the same as for the tensile strength at break described above. The same method is used in Examples described later. The tensile direction in the test is not particularly limited. When the PSA sheet is a long piece, it is preferably in its length direction.

<Film-Like Substrate>

The film-like substrate disclosed herein preferably exhibits a tensile strength at break of 10 MPa or greater. The use of a film-like substrate showing such tensile strength at break makes the PSA sheet less susceptible to fracture and may provide excellent stretch removability (especially shear removability). With the film-like substrate showing such tensile strength at break, the workability tends to also increase. The tensile strength at break is more preferably 20 MPa or greater, or yet more preferably 30 MPa or greater (e.g. 45 MPa or greater, typically 60 MPa or greater). When the tensile strength at break is excessively high, the elasticity and stretchability of the film-like substrate tend to decrease. From such a viewpoint, the tensile strength at break is preferably about 100 MPa or less (e.g. 90 MPa or less, typically 80 MPa or less). The tensile strength at break is measured by the same method as for the PSA sheet. The same method can be used in Examples described later.

The film-like substrate disclosed herein preferably exhibits an elongation at break of 300% or greater. A substrate exhibiting such an elongation at break extends in relation to the pulling during PSA sheet removal. The extension caused the PSA sheet to deform and peel off the adherend. As described above, the pulling force interacts with the deformation of the substrate to further increase the stretch removability (especially the shear removability) of the PSA sheet. The elongation at break is more preferably 500% or greater (e.g. 700% or greater, typically 800% or greater). The upper limit of elongation at break is not particularly limited. From the standpoint of the workability for removal, it can be, for instance, about 1000% or less (typically 900% or less). The elongation at break is measured by the same method as for the PSA sheet. The same method can be used in Examples described later.

The film-like substrate disclosed herein preferably exhibits a 100% modulus of less than 10 MPa. When the 100% modulus of the film-like substrate is less than the prescribed value, in pulling the PSA sheet to cause tensile deformation for its removal from the adherend, the initial resistance during the pulling tends to be smaller, leading to excellent stretch removability. The 100% modulus is more preferably less than 5 MPa. The lower limit of the 100% modulus is not particularly limited. From the standpoint of the ease of application of the PSA sheet, it is usually suitably 0.5 MPa or greater (e.g. 1 MPa or greater). The 100% modulus is measured by the same method as for the PSA sheet. The same method can be used with respect to Examples described later.

The film-like substrate disclosed herein suitably exhibits a tensile recovery greater than 50%. The tensile recovery is preferably 70% or greater. The tensile recovery is more preferably 80% or greater (e.g. 90% or greater, typically 93% to 100%). This may bring about greater prevention of damage such as fracture, etc., during PSA sheet removal. The tensile recovery is measured by the same method as the measurement method for the tensile recovery of the PSA sheet. The same method can be used with respect to Examples described later.

As the film-like substrate (support substrate) supporting (backing) the PSA layer, various types of film-like substrate capable of bringing about a PSA sheet that exhibits the prescribed mechanical properties (tensile strength at break, elongation at break) can be used. As the substrate, for instance, a resin film can be preferably used. The resin film can be a non-foam resin film, rubbery film, foam film, etc. In particular, the non-foam resin film and rubbery film are preferable, with the non-foam resin film being more preferable. The non-foam resin film is essentially free of bubbles (voids) that may serve disadvantageously in terms of mechanical strength and tends to have superior mechanical strength such as tensile strength, etc., as compared with a foam body. The non-foam resin film is also superior in terms of workability, size stability, thickness precision, cost efficiency (costs), etc.

The "resin film" in this description refers to an essentially non-porous film and is conceptually distinctive from so-called non-woven fabric and woven fabric (i.e. the concept excludes non-woven fabric and woven fabric). In addition, the non-foam resin film refers to a resin film that has not been intentionally subjected to a foaming process. Specifically, the non-foam resin film may have an expansion rate below 1.1-fold (e.g. below 1.05-fold, typically below 1.01-fold).

Preferable examples of the resin material constituting the resin film disclosed herein include polyurethanes such as ether-based polyurethane, ester-based polyurethane, carbonate-based polyurethane, etc.; urethane (meth)acrylate-based polymers; polyolefins such as polyethylene (PE), polypropylene (PP), ethylene-propylene copolymer, ethylene-butene copolymer, etc.; polyesters such as polyethylene terephthalate (PET), polybutylene terephthalate (PBT), polyethylene naphthalate, polybutylene naphthalate, etc.; and polycarbonates. The resin material can be: a styrene-based copolymer (typically styrene-based elastomer) such as a styrene-butadiene copolymer, styrene-isoprene copolymer, styrene-ethylene-butylene copolymer, styrene-ethylene-propylene copolymer, styrene-butadiene-styrene copolymer, styrene-isoprene-styrene copolymer, etc.; an acrylic copolymer called acrylic rubber; or a vinyl chloride-based resin (PVC) such as soft polyvinyl chloride. The resin materials can be used singly as one species or in a combination of two or more species. The resin material encompasses species generally called rubber and thermoplastic elastomer.

In a preferable embodiment, the film-like substrate is a polyurethane-based resin film. Herein, the polyurethane-based resin film refers to a resin film comprising a polyurethane as the primary component (a component at the highest proportion, typically a component accounting for greater than 50% by weight) among resin components. The polyurethane-based resin film is typically formed of a material that does not substantially show a yield point and is a film material that is likely to form a PSA sheet with certain tensile strength at break and elongation as well as certain tensile recovery if necessary. The polyurethane-based resin film can also realize great physical properties without addition of additive(s) such as plasticizer, etc. Thus, it can be a preferable substrate in the art disclosed herein in view of preventing bleed-out of the additive(s) as well.

The proportion of polyurethane among the resin components in the polyurethane-based resin film is preferably 70% by weight or higher (e.g. 80% by weight or higher, typically 90% by weight or higher, and 100% by weight or lower). The polyurethane-based resin film disclosed herein may be a film formed of a polymer blend of a polyurethane and other resin. The other resin can be one, two or more species among an acrylic resin, polyolefin, polyester, polycarbonate and the like. Alternatively, the art disclosed herein can be implemented also in an embodiment using a substrate essentially free of other resin components besides polyurethane.

The polyurethane is a polymer synthesized by the polyaddition reaction of a polyol (e.g. a diol) and a polyisocyanate (e.g. diisocyanate) at a prescribed ratio. The NCO/OH ratio of the polyurethane can be suitably set to bring about desirable mechanical properties (e.g. tensile strength at break, elongation at break, tensile recovery) based on technical common knowledge to a skilled person in the art.

Examples of a polyol that can be used in synthesizing the polyurethane include diols such as ethylene glycol, propylene glycol, 1,3-propanediol, 1,4-butanediol, 1,5-pentanediol, neopentyl glycol, 1,6-hexanediol, 1,8-octanediol, polyoxytetramethylene glycol, diethylene glycol, polyethylene glycol, polypropylene glycol, etc.; polyester polyols which are polycondensates of the diols and dicarboxylic acids (e.g. adipic acid, azelaic acid, sebacic acid); carbonatediols such as polyalkylene carbonate diols, etc.; and the like. These can be used singly as one species or in a combination of two or more species.

The polyisocyanate that can be used in synthesizing the polyurethane includes an aromatic, aliphatic and alicyclic diisocyanate as well as their polymers (e.g. dimers, trimers), etc. Examples of the diisocyanate include tolylene diisocyanate, diphenylmethane diisocyanate, hexamethylene diisocyanate, xylylene diisocyanate, hydrogenated xylylene diisocyanate, isophorone diisocyanate, hydrogenated diphenylmethane diisocyanate, 1,5-naphthylene diisocyanate, 1,3-phenylene diisocyanate, 1,4-phenylene diisocyanate, butane-1,4-diisocyanate, 2,2,4-trimethylhexamethylene diisocyanate, 2,4,4-trimethylhexamethylene diisocyanate, cyclohexane-1,4-diisocyanate, dicyclohexylmethane-4,4-diisocyanate, 1,3-bis(isocyanatemethyl)cyclohexane, methylcyclohexane diisocyanate, m-tetramethylxylylene diisocyanate, and the like. These can be used singly as one species or in a combination of two or more species. Among them, an aromatic diisocyanate is preferable.

The polyurethane may include other copolymerized component(s) in addition to the polyol and polyisocyanate. As the other copolymerized component(s), one, two or more species can be used among a monocarboxylic acid, dicarboxylic acid, trifunctional or higher polycarboxylic acid, hydroxycarboxylic acid, alkoxycarboxylic acid, their derivatives and the like. The proportion of these other copolymerized component(s) is suitably less than about 30% by weight (e.g. less than 10% by weight, typically less than 5% by weight) of the polyurethane. The art disclosed herein can be preferably implemented in an embodiment comprising a polyurethane-based resin film substrate comprising, as the primary component, a polyurethane free of other copolymerized components.

In another preferable embodiment, the film-like substrate is a resin film comprising a urethane (meth)acrylate-based polymer. As the urethane (meth)acrylate-based polymer, a polymer comprising a structural moiety derived from a urethane (meth)acrylate can be used. Here, the urethane (meth)acrylate refers to a compound having a urethane bond and a (meth)acryloyl group in a molecule and such a compound can be used without particular limitations. For the urethane (meth)acrylate, solely one species or a combination of two or more species can be used. The urethane (meth)acrylate preferably has two or more urethane bonds as well as two or more (meth)acryloyl groups. The number of (meth)acryloyl groups in the urethane (meth)acrylate is preferably 2 to 5, or more preferably 2 to 3. For instance, a urethane (meth)acrylate having two (meth)acryloyl groups can be preferably used. The urethane (meth)acrylate is preferably a urethane acrylate. Here, the term "urethane acrylate" refers to a urethane (meth)acrylate in which the ratio by number of acryloyl groups exceeds 50% of the (meth)acryloyl groups contained therein.

As the urethane (meth)acrylate, various commercial urethane (meth)acrylates can be used. For instance, trade name UV-3300B available from Nippon Synthetic Chemical Industry Co., Ltd., and trade name BEAM SET 505A-6 available from Arakawa Chemical Industries, Ltd., can be preferably used.

In another preferable embodiment, the film-like substrate is a PVC-based resin film. The PVC-based resin film is fabricated by forming (molding) film from a PVC-based resin composition (molding material) comprising a PVC-based resin. Here, the PVC-based resin composition refers to a resin composition in which a PVC-based resin (typically PVC) is the primary component (i.e. accounting for 50% by weight or more) among the resin components (polymers).

The PVC-based resin preferably accounts for about 80% by weight or more (more preferably about 90% by weight or more) of the total resin content in the PVC-based resin composition. Essentially all of the resin content can be PVC. Such a PVC-based resin composition can form a PVC-based resin film that exhibits favorable physical properties as the substrate of the PSA sheet.

The film-like substrate (e.g. a resin film substrate) may contain, as necessary, various additives such as fillers (inorganic fillers, organic fillers, etc.), colorant (pigment, dye), anti-aging agent, antioxidant, UV (ultraviolet ray) absorber, anti-static agent, slipping agent, plasticizer, and stabilizer. For instance, when a soft PVC-based resin film is used as the film-like substrate, it is suitable to add plasticizer in an amount of suitably about 20 parts to 100 parts by weight (preferably about 30 parts to 70 parts by weight) to 100 parts by weight of the PVC-based resin. The proportion of various additives added is usually less than about 30% by weight (e.g. less than 20% by weight, typically less than 10% by weight).

The surfaces of the film-like substrate may be subjected to a heretofore known surface treatment such as corona discharge treatment, plasma treatment, UV irradiation, acid treatment, alkali treatment, primer coating, etc. These surface treatments may increase the adhesion between the film-like substrate and PSA layer, that is, the anchoring of the PSA layer to the substrate. When the film-like substrate is a polyurethane-based resin film, because of its high surface energy, good anchoring can be attained without a given surface treatment as described above.

The film-like substrate may have a single-layer structure, or a two-layer, three-layer, or higher multi-layer structure. In a multi-layer structure, at least one layer (preferably each layer) preferably has a continuous structure of the resin (more preferably polyurethane). As for the method for producing the film-like substrate, a heretofore known method can be suitably employed without particular limitations. When using a resin film substrate as the film-like substrate, can be suitably employed a general film-forming method such as extrusion, inflation molding, T-die cast molding, calendar roll molding, etc.

The thickness of the film-like substrate is not particularly limited and can be suitably selected in accordance with the purpose. It is usually suitably about 20 μm or larger (e.g. 30 μm or larger, typically 50 μm or larger), or preferably 60 μm or larger (e.g. 70 μm or larger, typically 80 μm or larger). A film-like substrate having such a thickness may be less susceptible to fracture and provide excellent stretch removability. The thickness of the film-like substrate is preferably 300 μm or smaller, or more preferably 200 μm or smaller (e.g. 150 μm or smaller, typically 120 μm or smaller). According to the art disclosed herein, even in a construction using a substrate having a thickness equal to or smaller than the prescribed value, good stretch removability can be obtained. Making the film-like substrate thinner is also advantages in reducing the thickness, volume and weight of the PSA sheet, saving raw materials, etc.

<PSA Layer>

The PSA layer (including the first and second PSA layers in an on-substrate double-faced PSA sheet; the same applies hereinafter) disclosed herein may comprise, as its base polymer(s), one, two or more species among various types of rubbery polymers such as acrylic polymers, rubber-based polymers, polyester-based polymers, urethane-based polymers, polyether-based polymers, silicone-based polymers, polyamide-based polymers, fluorinated polymers, and the like. While details will be described later, the PSA layer disclosed herein is preferably an acrylic PSA layer comprising an acrylic polymer as the base polymer, a rubber-based PSA layer comprising a rubber-based polymer as the base polymer, or a urethane-based PSA layer comprising a urethane-based polymer as the base polymer. Alternatively, it can be a PSA layer comprising an acrylic polymer and a rubber-based polymer together as the base polymer.

(Acrylic PSA Layer)

In a preferable embodiment, from the standpoint of the adhesive properties (typically shear adhesive strength), molecular design, stability over time, etc., the PSA layer is an acrylic PSA layer comprising an acrylic polymer as the base polymer. As used herein, the "base polymer" of a PSA refers to the primary component (typically a component accounting for greater than 50% by weight) among the polymer components in the PSA.

(Acrylic Polymer)

As the acrylic polymer, for instance, a preferable polymer is formed of starting monomer(s) comprising an alkyl (meth)acrylate as the primary monomer and possibly a secondary monomer copolymerizable with the primary monomer. The primary monomer herein refers to a component that accounts for more than 50% by weight of all the monomers in the starting monomer(s).

As the alkyl (meth)acrylate, for instance, can be preferably used a compound represented by the following formula (1):

$$CH_2=C(R^1)COOR^2 \qquad (1)$$

Here, $R^1$ in the formula (1) is a hydrogen atom or a methyl group. $R^2$ is an acrylic alkyl group having 1 to 20 carbon atoms (such a range of the number of carbon atoms may be indicated as "$C_{1-20}$" hereinafter). From the standpoint of the storage elastic modulus of the PSA, etc., an alkyl (meth)acrylate with $R^2$ being a $C_{1-14}$ (e.g. $C_{2-10}$, typically $C_{4-8}$) linear alkyl group is preferable, and an alkyl (meth)acrylate with $R^1$ being a hydrogen atom and $R^2$ being a $C_{4-8}$ acyclic alkyl group is more preferable. As the alkyl (meth)acrylate with $R^2$ being a $C_{1-20}$ acyclic alkyl group, solely one species or a combination of two or more species can be used. Preferable alkyl (meth)acrylates include n-butyl acrylate (BA) and 2-ethylhexyl acrylate (2EHA). From the standpoint of the adhesive properties and adhesive transfer resistance, etc., BA is more preferable.

The primary monomer content in all the monomers is preferably 70% by weight or greater (e.g. 85% by weight or greater, typically 90% by weight or greater). The upper limit of primary monomer content is not particularly limited. Preferably, it is 99.5% by weight or less (e.g. 99% by weight or less).

The secondary monomer copolymerizable with the alkyl (meth)acrylate being the primary monomer may be useful for introducing crosslinking points in the acrylic polymer or increasing the cohesive strength of the acrylic polymer. As the secondary monomer, one, two or more species of functional group-containing monomers can be used, for instance, a carboxyl group-containing monomer, hydroxyl group-containing monomer, acid anhydride group-containing monomer, amide group-containing monomer, amino group-containing monomer, keto group-containing monomer, monomer having a nitrogen atom-containing ring, alkoxysilyl group-containing monomer, imide group-containing monomer, epoxy group-containing monomer, etc. For instance, from the standpoint of increasing the cohesive strength, a preferable acrylic polymer is one in which a carboxyl group-containing monomer and/or hydroxyl group-containing monomer are copolymerized as the secondary monomer. Preferable examples of the carboxyl group-containing monomer include acrylic acid (AA), methacrylic acid (MAA) and the like. Examples of the hydroxyl group-containing monomer include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, etc., as well as unsaturated alcohols and the like. Among them, hydroxyalkyl (meth)acrylates are preferable, with 2-hydroxyethyl acrylate (HEA) and 4-hydroxybutyl acrylate (4HBA) being more preferable.

The amount of the secondary monomer can be suitably selected to produce desirable cohesive strength without particular limitations. Usually, from the standpoint of combining well-balanced adhesive strength and cohesive strength, the amount of secondary monomer is suitably 0.5% by weight or more, or preferably 1% by weight or more of all the monomers in the acrylic polymer. The amount of the secondary monomer is suitably 30% by weight or less, or preferably 10% by weight or less (e.g. 5% by weight or less) of all the monomers. When a hydroxyl group-containing monomer is copolymerized in the acrylic polymer, the hydroxyl group-containing monomer content is preferably in a range of about 0.001 to 10% by weight (e.g. 0.01 to 5% by weight, typically 0.05 to 2% by weight) of all the monomers used for synthesis of the acrylic polymer. This may bring about a PSA having a higher level of well-balanced adhesive strength and cohesive strength.

In the acrylic polymer disclosed herein, a monomer (other monomer) besides those described above may be copolymerized to an extent not significantly impairing the effects of the present invention. For instance, the other monomer can be used for adjusting the glass transition temperature of the acrylic polymer, adjusting the adhesive properties (e.g. removability), etc. Examples of a monomer capable of increasing the cohesive strength of PSA include a sulfonate group-containing monomer, phosphate group-containing monomer, cyano group-containing monomer, vinyl ester, aromatic vinyl compound, etc. As the other monomer, solely one species or a combination of two or more species can be used. Among them, the vinyl ester is a preferable example. Specific examples of the vinyl ester include vinyl acetate (VAc), vinyl propionate, vinyl laurate, etc. In particular, VAc is preferable. The other monomer content is preferably about 30% by weight or less (typically 0.01 to 30% by weight, e.g. 0.1 to 10% by weight) of all the monomers used for synthesis of the acrylic polymer.

The copolymer composition of the acrylic polymer is designed such that the polymer has a glass transition temperature (Tg) of suitably −15° C. or below (typically −70° C. or above, and −15° C. or below), preferably −25° C. or below (typically −60° C. or above, and −25° C. or below), or more preferably −40° C. or below (e.g. −60° C. or above, and −40° C. or below). From the standpoint of the impact resistance of the PSA sheet, etc., it is preferable that the acrylic polymer has a Tg value at or below the upper limit.

The Tg of the acrylic polymer can be adjusted by suitably changing the monomer composition (i.e. types and relative amounts of monomers used for the synthesis of the polymer). Herein, the Tg of the acrylic polymer refers to a value determined by the Fox equation based on the Tg values of homopolymers of the respective monomers constituting the polymer and weight fractions (copolymerization ratio by weight) of the monomers. As shown below, the Fox equation is a relational expression of the Tg of a copolymer and the glass transition temperatures Tgi of the homopolymers obtained by homopolymerization of the monomers constituting the copolymer.

$$1/Tg=\Sigma(Wi/Tgi)$$

In the Fox equation, Tg represents the glass transition temperature (unit: K) of the copolymer, Wi the weight fraction (copolymerization ratio by weight) of a monomer i in the copolymer, and Tgi the glass transition temperature (unit: K) of the homopolymer of the monomer i. As the Tg values of homopolymers, values given in a known document are used.

As the Tg values of the homopolymers, the following values are used with respect to the monomers shown next:
2-ethylhexyl acrylate −70° C.
butyl acrylate −55° C.
vinyl acetate 32° C.
acrylic acid 106° C.
methacrylic acid 228° C.
2-hydroxyethyl acrylate −15° C.

With respect to monomers other than those listed above, for the Tg values of the corresponding homopolymers, values given in "Polymer Handbook" (3rd edition, John Wiley & Sons, Inc., Year 1989) are used. When no values are given in the reference book, values obtained by the following measurement method are used (see Japanese Patent Application Publication No. 2007-51271).

The method for obtaining the acrylic polymer is not particularly limited. Various polymerization methods known as synthetic means for acrylic polymers can be suitably employed, with the methods including a solution polymerization method, emulsion polymerization method, bulk polymerization method, suspension polymerization method, etc. For instance, a solution polymerization method can be preferably used. As a method for supplying monomers when carrying out solution polymerization, can be suitably employed an all-at-once supply method to supply all starting monomers at once, continuous (dropwise) supply method, portionwise (dropwise) supply method, etc. The polymerization temperature can be suitably selected depending on the types of monomers and solvent being used, type of polymerization initiator, etc. For example, it can be about 20° C. to 170° C. (typically 40° C. to 140° C.). Alternatively, photopolymerization carried out by irradiating light such as UV light (typically in the presence of a photopolymerization initiator) or active energy ray polymerization carried out by irradiating radioactive rays such as β rays and γ rays can be employed.

The solvent (polymerization solvent) used for solution polymerization can be suitably selected among heretofore known organic solvents. For instance, aromatic compounds (typically aromatic hydrocarbons) such as toluene, etc., as well as aliphatic or alicyclic hydrocarbons such as ethyl acetate, etc., are preferably used.

The initiator used for the polymerization can be suitably selected from heretofore known polymerization initiators in accordance with the type of polymerization method. For instance, one, two or more species of azo-based polymerization initiator, such as 2,2'-azobisisobutylonitrile (AIBN), etc., can be preferably used. Other examples of the polymerization initiator include persulfate salts such as potassium persulfate, etc.; peroxide-based initiators such as benzoyl peroxide, hydrogen peroxide, etc.; substituted ethane-based initiators such as phenyl-substituted ethane, etc.; aromatic carbonyl compounds; and so on. Yet other examples of the polymerization initiator include a redox-based initiator by a combination of a peroxide and a reducing agent. These polymerization initiators can be used singly as one species or in a combination of two or more species. The polymerization initiator can be used in a typical amount, selected from a range of, for instance, about 0.005 to 1 part by weight (typically 0.01 to 1 part by weight) relative to 100 parts by weight of the total monomer content.

The weight average molecular weight (Mw) of the base polymer (preferably an acrylic polymer) disclosed herein is not particularly limited. It can be in a range of, for instance, $10\times10^4$ or larger, and $500\times10^4$ or smaller. From the standpoint of achieving a balance between cohesive strength and adhesive strength at a high level, the base polymer (preferably an acrylic polymer) has a Mw in a range of preferably $10\times10^4$ to $150\times10^4$, more preferably $20\times10^4$ to $110\times10^4$ (e.g. $20\times10^4$ to $75\times10^4$), or yet more preferably $35\times10^4$ to $90\times10^4$ ($35\times10^4$ to $65\times10^4$). The Mw herein refers to the value based on standard polystyrene determined by gel permeation chromatography (GPC). As the GPC system, for instance, model name "HLC-8320 GPC" (column: TSKgel GMH-H(S) available from Tosoh Corporation) can be used. The same applies to the polymers used in Examples described later.

(Rubber-Based Polymer)

In another preferable embodiment, the PSA layer is formed of a rubber-based PSA. The rubber-based PSA according to a preferable embodiment has, as its base polymer, a block copolymer of a mono-vinyl-substituted aromatic compound and a conjugated diene compound. The mono-vinyl-substituted aromatic compound refers to a compound in which a vinyl group-containing functional group is bonded to an aromatic ring. A typical example of the aromatic ring is a benzene ring (possibly a benzene ring substituted with a vinyl group-free functional group (e.g. an alkyl group)). Specific examples of the mono-vinyl-substituted aromatic compound include styrene, α-methylstyrene, vinyl toluenes and vinyl xylenes. Specific examples of the conjugated diene compound include 1,3-butadiene and isoprene. These block copolymers can be used as the base polymer solely as one species or in a combination of two or more species.

In Segment A (hard segment) of the block copolymer, the copolymerization ratio of the mono-vinyl-substituted aromatic compound (two or more species may be used) is preferably 70% by weight or higher (more preferably 90% by weight or higher, or possibly essentially 100% by weight). In Segment B (soft segment) of the block copolymer, the copolymerization ratio of the conjugated diene compound (two or more species can be used) is preferably 70% by weight or higher (more preferably 90% by weight or higher, or possibly essentially 100% by weight). With such a block copolymer, the PSA sheet can be made to produce higher performance.

The block copolymer may be a diblock copolymer, a triblock copolymer, a radial copolymer, a mixture of these, etc. In the triblock copolymer or the radial copolymer, it is preferable that Segment A (e.g. a styrene block) is placed at a terminus of the polymer chain. Segment A placed at the terminus of the polymer chain is likely to aggregate to form a domain, whereby pseudo crosslinks are formed, leading to increased cohesive strength of the PSA. In the art disclosed herein, from the standpoint of the adhesive strength (peel strength) and repulsion resistance to adherends, it is preferable to use a species having a diblock fraction of 30% by weight or higher (more preferably 40% by weight or higher, yet more preferably 50% by weight or higher, or particularly preferably 60% by weight or higher, typically 65% by weight or higher, e.g. 70% by weight or higher). From the standpoint of the resistance to continuous stress, a species having a diblock fraction of 90% by weight or lower (more preferably 85% by weight or lower, e.g. 80% by weight or lower) can be preferably used. For instance, it is preferable to use a block copolymer having a diblock fraction of 60% to 85% by weight.

(Styrene-Based Block Copolymer)

In a preferable embodiment of the art disclosed herein, the base polymer is a styrene-based block copolymer. For instance, it can be preferably implemented in an embodiment where the base polymer comprises at least either a styrene-isoprene block copolymer or a styrene-butadiene block copolymer. It is preferable that, in the styrene-based block copolymer in the PSA, the ratio of styrene-isoprene block copolymer is 70% by weight or higher, or the ratio of styrene-butadiene block copolymer is 70% by weight or higher, or the combined ratio of styrene-isoprene and styrene-butadiene block copolymers is 70% by weight or higher. In a preferable embodiment, essentially all (e.g. 95% to 100% by weight) of the styrene-based block copolymer is a styrene-isoprene block copolymer. In another preferable embodiment, essentially all (e.g. 95% to 100% by weight) of the styrene-based block copolymer is a styrene-butadiene block copolymer. With such a composition, the PSA sheet can be favorably made with well-balanced repulsion resistance and other adhesive properties.

The styrene-based block copolymer can be a diblock copolymer, a triblock copolymer, a radial copolymer, a mixture of these, etc. In the triblock copolymer and the radial copolymer, it is preferable that a styrene block is placed at a terminus of the polymer chain. The styrene block placed at the terminus of the polymer chain is likely to aggregate to form a styrene domain, whereby pseudo cross-links are formed, leading to increased cohesive strength of the PSA. From the standpoint of the adhesive strength (peel strength) and repulsion resistance to adherends, as the styrene-based block copolymer used in the art disclosed herein, it is preferable to use, for instance, a species having a diblock fraction of 30% by weight or higher (more preferably 40% by weight or higher, yet more preferably 50% by weight or higher, or particularly preferably 60% by weight or higher, typically 65% by weight or higher). The styrene-based block copolymer may have a diblock fraction of 70% by weight or higher (e.g. 75% by weight or higher). From the standpoint of the holding power, etc., it is preferable to use a styrene-based block copolymer having a diblock fraction of 90% by weight or lower (more preferably 85% by weight or lower, e.g. 80% by weight or lower). For instance, a styrene-based block copolymer having a diblock fraction of 60% to 85% by weight can be preferably used.

The styrene content of the styrene-based block copolymer can be, for instance, 5% to 40% by weight. From the standpoint of the repulsion resistance and holding power, a styrene-based block copolymer whose styrene content is 10% by weight or higher (more preferably higher than 10% by weight, e.g. 12% by weight or higher) is usually preferable. From the standpoint of the adhesive strength to adherends, a styrene-based block copolymer whose styrene content is 35% by weight or lower (typically 30% by weight or lower, more preferably 25% by weight or lower, e.g. lower than 20% by weight) is preferable. For instance, a styrene-based block copolymer whose styrene content is 12% by weight or higher, and lower than 20% by weight can be preferably used.

(Urethane-Based Polymer)

In yet another preferable embodiment, the PSA layer is formed with a urethane-based PSA. Here, the urethane-based PSA (layer) refers to a PSA (layer) comprising a urethane-based polymer as the base polymer. The urethane-based PSA is typically formed of a urethane-based resin that comprises, as the base polymer, a urethane-based polymer obtainable by a reaction of a polyol and a polyisocyanate compound. The urethane-based polymer is not particularly limited and a suitable species can be used among various urethane-based polymers (ether-based polyurethanes, ester-based polyurethanes, carbonate-based polyurethanes, etc.) capable of working as PSA. Examples of the polyol include polyether polyols, polyester polyols, polycarbonate polyols, and polycaprolactone polyols. Examples of the polyisocyanate compound include diphenylmethane diisocyanate, tolylene diisocyanate, and hexamethylene diisocyanate.

(PSA Composition)

The PSA layer disclosed herein may be formed from an aqueous PSA composition, solvent-based PSA composition, hot-melt PSA composition, or active energy ray-curable PSA composition. The aqueous PSA composition refers to a PSA composition comprising a PSA (PSA layer-forming components) in a solvent primarily comprising water (an aqueous solvent) and may typically be what is called a water-dispersed PSA composition (a composition in which the PSA is at least partially dispersed in water). The solvent-based PSA composition refers to a PSA composition comprising a PSA in an organic solvent. From the standpoint of preferably obtaining adhesive properties such as shear adhesive strength, etc., the art disclosed herein is preferably implemented in an embodiment comprising a PSA layer formed from a solvent-based PSA composition.

(Acrylic Oligomer)

The PSA composition disclosed herein may comprise an acrylic oligomer. The use of the acrylic oligomer may improve the impact resistance and repulsion resistance in a well-balanced manner. In an embodiment where the PSA composition is cured by active energy ray irradiation (e.g. UV irradiation), the acrylic oligomer has an advantage such that it is less susceptible to curing inhibition (e.g. inhibition of polymerization of unreacted monomers) as compared to, for instance, rosin-based and terpene-based tackifier resins. The acrylic oligomer is a polymer comprising an acrylic monomer as its monomeric component and is defined as a polymer having a smaller Mw than the acrylic polymer described above.

The acrylic monomer content in all the monomers constituting the acrylic oligomer is typically higher than 50% by weight, preferably 60% by weight or higher, or more preferably 70% by weight or higher (e.g. 80% by weight or higher, or even 90% by weight or higher). In a preferable embodiment, the acrylic oligomer has a monomer composition essentially consisting of an acrylic monomer.

As the monomeric components of the acrylic oligomer, it is possible to use the acyclic alkyl (meth)acrylates, functional group-containing monomers and other monomers exemplified as the monomer that can be used in the acrylic polymer. The monomeric components may include an alicyclic hydrocarbon group-containing (meth)acrylate. As the monomers constituting the acrylic oligomer, one, two or more species can be used among the various monomers exemplified above.

As the acyclic alkyl (meth)acrylate, it is preferable to use an alkyl (meth)acrylate with $R^2$ in the formula (1) being a $C_{1-12}$ (e.g. $C_{1-8}$) alkyl group. Favorable examples thereof include methyl methacrylate (MMA), ethyl acrylate, n-butyl acrylate (BA), isobutyl methacrylate, t-butyl acrylate, and 2-ethylhexyl acrylate (2EHA). Among them, MMA is more preferable.

Favorable examples of the functional group-containing monomer include monomers having nitrogen atom-containing rings (typically nitrogen atom-containing heterocycles) such as N-vinyl-2-pyrrolidone and N-acryloylmorpholine; amino group-containing monomers such as N,N-dimethylaminoethyl (meth)acrylate; amide group-containing monomers such as N,N-diethyl (meth)acrylamide; carboxy group-containing monomers such as AA and MAA; and hydroxy group-containing monomers such as HEA.

As the alicyclic hydrocarbon group-containing (meth) acrylate, one, two or more species can be used among, for instance, alicyclic hydrocarbon group-containing (meth) acrylates in which the number of carbon atoms in the alicyclic hydrocarbon group is in a range of 4 to 20. The number of carbon atoms is preferably 5 or greater (e.g. 6 or greater, typically 8 or greater). It is preferably 16 or less (e.g. 12 or less, typically 10 or less). Favorable examples of the alicyclic hydrocarbon group-containing (meth)acrylate include cyclohexyl (meth)acrylate, isobornyl (meth)acrylate, dicyclopentenyl (meth)acrylate, and dicyclopentanyl (meth)acrylate. Among them, dicyclopentanyl methacrylate (DCPMA) is more preferable.

From the standpoint of the adhesion and cohesion, the ratio (i.e. copolymerization ratio) of alicyclic hydrocarbon group-containing (meth)acrylate in all the monomers constituting the acrylic oligomer is preferably about 30% to 90% by weight (e.g. 50% to 80% by weight, typically 55% to 70% by weight).

In a preferable embodiment, the acrylic oligomer comprises, as its monomeric components, an acyclic alkyl (meth)acrylate and/or an alicyclic hydrocarbon group-containing (meth)acrylate. In this embodiment, the ratio of the acyclic alkyl group-containing and alicyclic hydrocarbon group-containing (meth)acrylic acid esters in all the acrylic oligomer-constituting monomers is preferably about 80% by weight or higher (e.g. 90% to 100% by weight, typically 95% to 100% by weight). It is preferable that the acrylic oligomer-constituting monomers essentially consist of an acyclic alkyl (meth)acrylate and/or an alicyclic hydrocarbon group-containing (meth)acrylate.

When the acrylic oligomer is a copolymer of a monomer mixture comprising an acyclic alkyl (meth)acrylate and/or an alicyclic hydrocarbon group-containing (meth)acrylate, the ratio of acyclic alkyl (meth)acrylate to alicyclic hydrocarbon group-containing (meth)acrylate is not particularly limited. In a preferable embodiment, in the monomers constituting the acrylic oligomer, the weight ratio $(W_A:W_B)$ of weight fraction $(W_A)$ of acyclic alkyl (meth)acrylate to weight fraction $(W_B)$ of alicyclic hydrocarbon group-containing (meth)acrylate is 1:9 to 9:1, or preferably 2:8 to 7:3 (e.g. 3:7 to 6:4, typically 3:7 to 5:5).

While no particular limitations are imposed, the monomer composition (i.e. copolymer composition) of the acrylic oligomer can be selected so that the acrylic oligomer has a Tg of 10° C. or higher, and 300° C. or lower. Here, the Tg of an acrylic oligomer refers to the value determined based on the monomer composition of the acrylic oligomer in the same manner as for the Tg based on the monomer composition of the acrylic polymer. From the standpoint of the initial adhesion, the acrylic oligomer's Tg is preferably 180° C. or lower (e.g. 160° C. or lower). From the standpoint of the cohesion of the PSA, the Tg is preferably 60° C. or higher (e.g. 100° C. or higher, typically 120° C. or higher).

The acrylic oligomer's Mw is not particularly limited. It is typically about $0.1 \times 10^4$ to $3 \times 10^4$. From the standpoint of increasing the adhesive properties (e.g. adhesive strength and repulsion resistance), the acrylic oligomer has a Mw of preferably $1.5 \times 10^4$ or lower, more preferably $1 \times 10^4$ or lower, or yet more preferably $0.8 \times 10^4$ or lower (e.g. $0.6 \times 10^4$ or lower). From the standpoint of the cohesion of the PSA, etc., the Mw is preferably $0.2 \times 10^4$ or higher (e.g. $0.3 \times 10^4$ or higher). The molecular weight of the acrylic oligomer can be adjusted with the use of a chain transfer agent as necessary in the polymerization, etc.

The acrylic oligomer can be formed by polymerizing the corresponding monomer components. The method and conditions for the polymerization are not particularly limited. Various conventional polymerization methods (e.g. solution polymerization, emulsion polymerization, bulk polymerization, photopolymerization, radiation polymerization, etc.) can be used under suitable conditions. The type and amount of polymerization initiator (e.g. azo-based polymerization initiator such as AIBN) that can be used as necessary are also mostly as discussed earlier. Accordingly, details are not repeated here.

The acrylic oligomer content in the PSA composition disclosed herein is suitably, for instance, 0.5 part by weight or greater to 100 parts by weight of the acrylic polymer. From the standpoint of obtaining greater effects of the acrylic oligomer, the acrylic oligomer content is preferably 1 part by weight or greater (e.g. 1.5 parts by weight or greater, typically 2 parts by weight or greater). From the standpoint of the PSA composition's curing properties and compatibility to the acrylic polymer, the acrylic oligomer content is suitably less than 50 parts by weight (e.g. less than 10 parts by weight), or preferably less than 8 parts by weight (e.g. less than 7 parts by weight, typically 5 parts by weight or less). Even when added in such a small amount, the use of the acrylic oligomer can bring about greater resistance to impact and to repulsion.

(Tackifier)

The PSA layer disclosed herein may have a composition comprising a tackifier. The tackifier is not particularly limited. Various tackifier resins can be used, for instance, a rosin-based tackifier resin, terpene-based tackifier resin, hydrocarbon-based tackifier resin, epoxy-based tackifier resin, polyamide-based tackifier resin, elastomer-based tackifier resin, phenol-based tackifier resin, ketone-based tackifier resin, etc. These tackifier resins can be used singly as one species or in a combination of two or more species.

Specific examples of the rosin-based tackifier resin include unmodified rosins (raw rosins) such as gum rosin, wood rosin, tall-oil rosin, etc.; modified rosins (hydrogenated rosins, disproportionated rosins, polymerized rosins, other chemically-modified rosins, etc., and the same applies hereinafter) obtainable from these unmodified rosins via modifications such as hydrogenation, disproportionation, polymerization, etc.; various other rosin derivatives; and the like. Examples of the rosin derivatives include rosin esters such as unmodified rosins esterified with alcohols (i.e., esterification products of unmodified rosins), modified rosins esterified with alcohols (i.e., esterification products of modified rosins), and the like; unsaturated fatty acid-modified rosins such as unmodified rosins and modified rosins modified with unsaturated fatty acids; unsaturated fatty acid-modified rosin esters such as rosin esters modified with unsaturated fatty acids; rosin alcohols from the reductive treatment of a carboxyl group in unmodified rosins, modified rosins, unsaturated fatty acid-modified rosins or unsaturated fatty acid-modified rosin esters; metal salts of rosins (in particular, of rosin esters) such as unmodified rosins, modified rosins, various rosin derivatives, etc.; rosin phenol resins obtainable from the addition of phenol to rosins (unmodified rosin, modified rosin, various rosin derivatives, etc.) by heat polymerization in the presence of an acid catalyst; and so on. When an acrylic polymer is used as the base polymer, it is preferable to use a rosin-based tackifier resin. From the standpoint of increasing the adhesive properties such as adhesive strength, etc., it is more preferable to use a combination of two, three or more species of varied types and properties (e.g. softening point), etc., among the rosin-based tackifier resins.

Examples of the terpene-based tackifier resin include terpene resins such as an α-pinene polymer, β-pinene polymer, dipentene polymer, etc.; modified terpene resins from the modification (e.g., phenol modification, aromatic group modification, hydrogenation, hydrocarbon modification, etc.) of these terpene resins; and the like. Examples of the modified terpene resins include a terpene-modified phenol resin, styrene-modified terpene resin, aromatic group-modified terpene resin, hydrogenated terpene resin, and the like. When an acrylic polymer is used as the base polymer, the use of a terpene-based tackifier resin (e.g. terpene-modified phenol resin) is preferable. In particular, from the standpoint of increasing the adhesive properties such as adhesive strength, etc., it is preferable to use one species or a combination of two or more species of varied types and properties (e.g. softening point), etc., among the terpene-based tackifier resins (e.g. terpene-modified phenol resins).

Examples of the hydrocarbon-based tackifier resin include various hydrocarbon-based resins such as aliphatic hydrocarbon resins, aromatic hydrocarbon resins, alicyclic hydrocarbon resins, aliphatic-aromatic petroleum resins (styrene-olefin-based copolymers, etc.), aliphatic-alicyclic petroleum resins, hydrogenated hydrocarbon resins, coumarone-based resins, coumarone-indene-based resins, and the like.

In the art disclosed herein, a preferable resin has a softening point (softening temperature) of about 70° C. or higher (preferably about 100° C. or higher, more preferably about 110° C. or higher). With a PSA comprising a tackifier resin having a softening point at or above this lower limit, a PSA sheet can be obtained with greater adhesive strength. Among the tackifier resins exemplified above, it is preferable to use a terpene-based tackifier resin (e.g. terpene-modified phenol resin), rosin-based tackifier resin (e.g. esterification product of polymerized rosin), etc., having such a softening point. The upper limit of softening point of the tackifier resin is not particularly limited. For instance, it can be about 200° C. or lower (typically about 180° C. or lower). The softening point of a tackifier resin referred to herein is defined as the value measured by the softening point test method (ring and ball method) specified in either JIS K 5902 or JIS K 2207.

The amount of tackifier resin used is not particularly limited, and can be selected in accordance with the target adhesive properties (adhesive strength, etc.). For example, based on non-volatiles, relative to 100 parts by weight of the acrylic polymer, a tackifier resin is preferably used in an amount of about 10 to 100 parts by weight (more preferably 20 to 80 parts by mass, or even more preferably 30 to 60 parts by weight).

When the PSA layer is formed of a rubber-based PSA, the rubber-based PSA preferably comprises a high softening point resin having a softening point of 120° C. or higher as the tackifier resin. The PSA sheet in such an embodiment is preferable from the standpoint of the repulsion resistance, holding power, etc. In a preferable embodiment, the high softening point resin may comprise a tackifier resin having a softening point of 125° C. or higher (more preferably 130° C. or higher, yet more preferably 135° C. or higher, e.g. 140° C. or higher). From the standpoint of the adhesive strength to adherends, etc., the softening point of the high softening point resin is usually suitably 200° C. or lower, preferably 180° C. or lower, or more preferably 170° C. or lower (e.g. 160° C. or lower).

As the high softening point resin, it is preferable to use terpene-phenol resins, polymerized rosins and esterification products of polymerized rosins, and the like. These high softening point resins can be used solely as one species or in a combination of two or more species. In a preferable embodiment, the high softening point resin comprises one, two or more species of terpene-phenol resin. For instance, a preferable terpene-phenol resin has a softening point of 120° C. or higher, and 200° C. or lower (typically 120° C. or higher, and 180° C. or lower, e.g. 125° C. or higher, and 170° C. or lower).

As the terpene-phenol resin, it is preferable to use a species having a softening point of 120° C. or higher and a hydroxyl value (OH value) of 40 mg KOH/g or higher (typically 40 mg KOH/g to 200 mg KOH/g, e.g. 40 mg KOH/g to 160 mg KOH/g). With a terpene-phenol resin having such a hydroxyl value, the PSA sheet can be made to produce higher performance. As the hydroxyl value in this description, the value measured by the potentiometric titration specified in JIS K 0070:1992 can be used. As the specific measurement method, the method described in Japanese Patent Application Publication No. 2014-55235 can be employed.

The art disclosed herein can be preferably implemented, for instance, in an embodiment where the rubber-based PSA comprises a high softening point resin (H1) having a hydroxyl value of 40 mg KOH/g or higher, and lower than 80 mg KOH/g in combination with a high softening point resin (H2) having a hydroxyl value of 80 mg KOH/g or higher (typically 80 mg KOH/g to 160 mg KOH/g, e.g. 80 mg KOH/g to 140 mg KOH/g). In this embodiment, with respect to the relationship between the high softening point resin (H1) and high softening point resin (H2) in terms of their amounts used, for instance, it can be selected so that their weight ratio (H1:H2) is in a range of 1:5 to 5:1, or usually suitably in a range of 1:3 to 3:1 (e.g. 1:2 to 2:1). In a preferable embodiment, each of the high softening point resin (H1) and high softening point resin (H2) is a terpene-phenol resin.

From the standpoint of the repulsion resistance, holding power, etc., the high softening point resin content can be, for instance, 20 parts by weight or higher relative to 100 parts by weight of the base polymer. It is preferably 30 parts by weight or higher (e.g. 35 parts by weight or higher). From the standpoint of the adhesive strength, low temperature properties (properties at low temperatures), etc., relative to 100 parts by weight of the base polymer, the high softening point resin content can be usually suitably, for instance, 100 parts by weight or lower, preferably 80 parts by weight or lower, or more preferably 70 parts by weight or lower. The high softening point resin content can be 60 parts by weight or lower (e.g. 50 parts by weight or lower).

The art disclosed herein can be implemented in an embodiment where the rubber-based PSA comprises a low softening point resin having a softening point of lower than 120° C. in place of or in addition to the high softening point resin. In a preferable embodiment, the rubber-based PSA comprises a high softening point resin that has a softening point of 120° C. or higher and a low softening point resin that has a softening point of lower than 120° C.

As the low softening point resin, a species having a softening point of, for instance, 40° C. or higher (typically 60° C. or higher) can be used. From the standpoint of the repulsion resistance, holding power, etc., it is usually preferable to use a species having a softening point of 80° C. or higher (more preferably 100° C. or higher), and lower than 120° C. A low softening point resin having a softening point of 110° C. or higher, and lower than 120° C. may be used.

The art disclosed herein can be preferably implemented in an embodiment where the rubber-based PSA comprises, as the low softening point resin, at least either a petroleum resin or a terpene resin (typically an unmodified terpene resin). For instance, in preferable compositions, the primary component (i.e. a component accounting for more than 50% by weight) of the low softening point resin is a petroleum resin, a terpene resin, a combination of a petroleum resin and a terpene resin, or the like. From the standpoint of the adhesive strength and the compatibility, an embodiment where the primary component of the low softening point resin is a terpene resin (e.g. β-pinene polymer) is preferable. Essentially all (e.g. 95% by weight or more) of the low softening point resin can be a terpene resin.

In a preferable embodiment, the low softening point resin may be a tackifier resin (a low hydroxyl value tackifier resin) having a hydroxyl value of zero or higher, and lower than 80 mg KOH/g. As the low hydroxyl value tackifier resin, among the various tackifier resins listed earlier, species having hydroxyl values in this range can be used singly or in a suitable combination. Examples that can be used include terpene phenol resins, petroleum resins (e.g. C5-based petroleum resins), terpene resins (e.g. β-pinene polymers), rosin-based resins (e.g. polymerized rosins), and rosin-derived resins (e.g. esterification products of polymerized rosins), each having a hydroxyl value of 0 or higher, and lower than 80 mg KOH/g.

From the standpoint of the adhesive strength to adherends, the ratio of low softening point resin to 100 parts by weight of the base polymer can be, for instance, 10 parts by weight or higher; it is usually suitably 15 parts by weight or higher (e.g. 20 parts by weight or higher). From the standpoint of the repulsion resistance, etc., the low softening point resin content is usually suitably 120 parts by weight or lower, preferably 90 parts by weight or lower, or more preferably 70 parts by weight or lower (e.g. 60 parts by weight or lower). The low softening point resin content can be 50 parts by weight or lower (e.g. 40 parts by weight or lower).

When the tackifier resin comprises a low softening point resin and a high softening point resin, their relative amounts used is preferably selected to yield a weight ratio of low softening point resin to high softening point resin of 1:5 to 3:1 (more preferably 1:5 to 2:1). The art disclosed herein can be preferably implemented in an embodiment where, in the rubber-based PSA, the high softening point resin is greater in amount than the low softening point resin (e.g. 1:1.2 to 1:5 weight ratio of low softening point resin to high softening point resin). In such an embodiment, the PSA sheet can be made to produce higher performance.

In the art disclosed herein, the tackifier resin content to 100 parts by weight of the base polymer (typically a rubber-based polymer) is usually suitably 20 parts by weight or higher, preferably 30 parts by weight or higher, or more preferably 40 parts by weight or higher (e.g. 50 parts by weight or higher). From the standpoint of the low-temperature properties (e.g. adhesive strength and impact resistance at low temperatures), the tackifier resin content to 100 parts by weight of the base polymer is usually suitably 200 parts by weight or lower, or preferably 150 parts by weight or lower. The tackifier resin content can be 100 parts by weight or lower (e.g. 80 parts by weight or lower) to 100 parts by weight of the base polymer.

(Other Additives)

The PSA composition may comprise a crosslinking agent as necessary. The type of crosslinking agent is not particularly limited and a suitable agent can be selected and used among heretofore known crosslinking agents. Examples of such crosslinking agents include an isocyanate-based crosslinking agent, epoxy-based crosslinking agent, oxazoline-based crosslinking agent, aziridine-based crosslinking agent, melamine-based crosslinking agent, peroxide-based crosslinking agent, metal chelate-based crosslinking agent, etc. For the crosslinking agent, solely one species or a combination of two or more species can be used. In particular, from the standpoint of increasing the cohesive strength, the use of an isocyanate-based crosslinking agent or epoxy-based crosslinking agent is preferable. The amount of crosslinking agent used is not particularly limited. For instance, it can be selected from a range of about 10 parts by weight or less (e.g. about 0.005 to 10 parts by weight, preferably about 0.01 to 5 parts by weight) relative to 100 parts by weight of the base polymer (e.g. an acrylic polymer).

The PSA composition may comprise various heretofore known fillers that can be contained in PSAs. As the fillers, various types of particulate substance and fibrous substance can be used. Examples of the material forming the particulate substance include metals such as copper, nickel, aluminum, chromium, iron, stainless steel, etc.; metal oxides such as alumina, zirconia, zinc oxide, etc.; carbides such as silicon carbide, boron carbide, nitrogen carbide, etc.; nitrides such as aluminum nitride, silicon nitride, boron nitride, etc.; inorganic materials such as calcium carbide, calcium carbonate, aluminum hydroxide, glass, silica, etc.; polymers such as a polystyrene, acrylic resin (e.g. polymethyl methacrylate), phenol resin, benzoguanamine resin, urea resin, silicone resin, polyester, polyurethane, polyethylene, polypropylene, polyamide (e.g. nylon, etc.), polyimide, polyvinylidene chloride, etc.; and the like. Alternatively, particulate natural raw materials may be used, such as volcanic shirasu, clay, sand and the like. The PSA composition may further comprise, as the fillers, hollow particulate substance (e.g. hollow particles formed from an inorganic material). Examples of such hollow particles include balloons made of glass such as hollow glass balloons, etc.; hollow balloons made of metal oxides such as hollow alumina balloons, etc.; hollow balloons made of ceramics such as hollow ceramic balloons, etc.; and the like. As the fibrous substance, various synthetic fibrous materials and natural fibrous materials can be used. Among these, solely one species or a combination of two or more species can be used. The amount of fillers added is not particularly limited. A suitable amount can be added based on the purpose of addition and technical common knowledge.

The PSA composition may contain as necessary various additives generally used in the field of PSA compositions, such as a leveling agent, crosslinking co-agent, plasticizer, softening agent, colorant (dye, pigment), anti-static agent, anti-aging agent, UV absorber, antioxidant, photostabilizing agent, etc. For instance, an adhesive strength-adjusting agent such as a silicone-based oligomer can be added to the PSA composition (typically an acrylic PSA composition). With respect to these various additives, those heretofore known can be used by typical methods. Since these do not specifically characterize the present invention, detailed descriptions are omitted.

(Method for Forming PSA Layer)

The PSA layer disclosed herein can be formed by a heretofore known method. For instance, it is possible to employ a method where the PSA composition is applied to a releasable surface (release face) and allowed to dry to form a PSA layer. In another usable method (direct method), where the PSA composition is directly provided (typically applied) to the film-like substrate and allowed to dry to form a PSA layer. In an alternative method (transfer method), the PSA composition is provided to a releasable surface (e.g. release face) and allowed to dry to form a PSA layer on the surface, and the PSA layer is transferred to the film-like substrate. As the release face, the surface of a release liner, a release agent-treated back face of a substrate, etc., can be used. The PSA layer disclosed herein is not limited to, but typically formed in a continuous form. For instance, the PSA layer may be formed in a regular or random pattern of dots, stripes, etc.

The PSA composition can be applied, using a heretofore known coater, for instance, a gravure coater, die coater, bar coater, etc. Alternatively, the PSA composition can be applied by impregnation, curtain coating method, etc. From the standpoint of facilitating the crosslinking reaction and increasing the productivity, etc., the PSA composition is preferably dried with heating. The drying temperature can be, for instance, about 40° C. to 150° C. (preferably about 60° C. to 130° C.). After dried, the PSA composition may be aged for adjusting the component migration in the PSA layer, pushing the crosslinking reaction forward, reducing strain that may be present in the substrate or PSA layer, and so on.

The thickness of the PSA layer disclosed herein is not particularly limited and can be suitably selected in accordance with the purpose. Usually, from the standpoint of the productivity such as drying efficiency as well as the adhesive properties, etc., the thickness of the PSA layer is suitably about 3 μm to 200 μm, preferably about 5 μm to 150 μm, more preferably 8 μm to 100 μm, or yet more preferably 15 μm to 80 μm. In a double-faced PSA sheet comprising a PSA layer on each face of a film-like substrate, the thicknesses of the respective PSA layers may be the same or different.

<Release Liner>

As the release liner, any conventional release paper or the like can be used without any particular limitations. For example, can be used a release liner having a release layer on a surface of a substrate such as resin film or paper, etc.; a release liner formed from a poorly-adhesive material such as a fluorine-based polymer (polytetrafluoroethylene, etc.) or a polyolefin-based resin (polyethylene, polypropylene, etc.); or the like. The release layer can be formed, for instance, by subjecting the substrate to a surface treatment with a release agent such as a silicone-based, a long-chain alkyl-based, a fluorine-based, a molybdenum disulfide-based release agent or the like.

<Size and Other Features of PSA Sheet>

When the PSA sheet disclosed herein is used as a long piece, since it is used in portable electronics, it may be constructed to have a width of about 30 mm or smaller (e.g. 20 mm or smaller, typically 15 mm or smaller). When the PSA sheet is too small in width, it may suffer damage such as tearing when stretch-removed. Thus, the PSA sheet preferably has a width of 1 mm or larger (e.g. 3 mm or larger, typically 5 mm or larger), or more preferably 10 mm or larger (e.g. 12 mm or larger).

When the PSA sheet disclosed herein is used as a long piece, from the standpoint of the ease of stretch removal, it preferably has a length of 1 cm or larger (e.g. 3 cm or larger, typically 5 cm or larger). When the PSA sheet is too long, removal of the PSA sheet tends to be hindered. Accordingly, the PSA sheet preferably has a length of 30 cm or smaller (e.g. 15 cm or smaller, typically 5 cm or smaller).

The PSA sheet disclosed herein (including any PSA layer(s) and substrate, but excluding any release liner) is not particularly limited in overall thickness. The overall thickness of the PSA sheet is suitably about 30 μm to 500 μm. In view of the adhesive properties, etc., the overall thickness of the PSA sheet is preferably about 40 μm to 300 μm (e.g. 50 μm to 200 μm). When the overall thickness of the PSA sheet is at or below a certain value, it can be an advantage in view of making the PSA sheet thinner, smaller, lighter, resource-saving, and so on.

While no particular limitations are imposed, examples of the use of the PSA sheet disclosed herein include application to adherends having surfaces formed of metallic materials such as stainless steel (SUS) and aluminum; inorganic materials such as glass and ceramic; resin materials such as nylon, polycarbonate (PC), polymethyl methacrylate (PMMA), polypropylene, and polyethylene terephthalate (PET); rubber materials such as natural rubber and butyl rubber; and their composite materials.

<Applications>

The PSA sheet disclosed herein provides highly reliable adhesion and great stretch removability from adherends. With the benefit of these features, it can be preferably used as a PSA sheet for use in portable electronics where highly reliable adhesion is required when applied, but its smooth removal is necessary for parts repair, replacement, inspection, recycling, etc. Examples of preferable applications include fastening protection panels (lenses) to protect displays, fastening key moduli, fastening rim sheets, fastening decorative panels, fastening batteries, and fastening various other components (circuit boards, various panel components, buttons, lightning parts, internal camera parts, heat-releasing materials, graphite sheets) as well as fixing labels (including various marks) such as logos and other various design materials, in portable electronics such as mobile phones, smartphones, tablet PCs, notebook PCs, various wearable devices (e.g. wrist wears put on wrists such as wrist watches; modular devices attached to bodies with a clip, strap, etc.; eye wears including glass-shaped wears (monoscopic or stereoscopic, including head-mounted pieces); clothing types worn as, for instance, accessories on shirts, socks, hats/caps, etc.; ear wears such as earphones put on ears; etc.), digital cameras, digital video cameras, acoustic equipment (portable music players, IC recorders, etc.), calculators (e.g. pocket calculators), handheld game devices, electronic dictionaries, electronic notebooks, electronic books, vehicle navigation devices, portable radios, portable TVs, portable printers, portable scanners, and portable modems. Being portable in this description means not just providing simple mobility, but further providing a level of portability that allows an individual (average adult) to carry it relatively easily.

The PSA sheet disclosed herein (typically a double-faced PSA sheet) provides a great ability (pull-out removability) that allows its pull-out removal from between adherends. Herein, the pull-out removability refers to the ease of removal carried out in such a way that from two adherends fastened via the PSA sheet with a segment (typically a tab) thereof being exposed, the PSA sheet is drawn out by pulling the exposed segment to release the attachment (typically a joint) between the adherends. The two adherends may be two different locations in a single component. More specific descriptions are provided below with reference to FIGS. 3 and 4.

FIGS. 3(a)-(c) show schematic side views to illustrate an embodiment of stretch removal (typically pull-out removal), with 3(a) showing the state of the PSA sheet at the start of stretch removal, 3(b) showing the state of the PSA sheet being pulled for removal and 3(c) showing the state of the PSA sheet at the completion of stretch removal. FIGS. 4(a)-(c) show schematic top views to illustrate an embodiment of stretch removal (typically pull-out removal), with 4(a)-(c) corresponding to FIG. 3(a)-(c), respectively.

As shown in FIG. 3(a) and FIG. 4(a), a PSA sheet (double-faced PSA sheet) 200 is provided with a tab T which is exposed to the outside when joining adherends A and B. The PSA sheet 200 is used to join adherend A and adherend B. After the purpose of joining is fulfilled, tab T is pinched with fingers and PSA sheet 200 is pulled so as to draw it out from between adherends A and B. PSA sheet 200 then begins to extend while contracting in the direction perpendicular to the pulling direction and starts to peel off adherends A and B (see FIG. 3(b), FIG. 4(b)). Eventually, the entire adhesion area of PSA sheet 200 peels off, resulting in completion of stretch-removal of PSA sheet 200 from the interface between adherends A and B (see FIG. 3(c), FIG. 4(c)). The detachment of adherend B that had been joined to adherend A is also completed at the same time.

A PSA sheet with excellent stretch removability as described above is preferable as a PSA sheet used for fastening batteries (including primary and secondary batteries, e.g. polymer batteries) in portable electronics. Batteries are often placed in locations where their removal is usually required for repair, replacement, inspection, etc., of components (including batteries) in portable electronics. Accordingly, removal is frequently required with the battery-fastening PSA sheets. When used for this purpose, the PSA sheet provides a function to properly fasten a battery. At the same time, when detaching the battery at the end-of-life, by means of stretch removal (typically pull-out removal), it can be easily detached. The PSA sheet is particularly preferably used as a PSA sheet for fastening a polymer battery. Polymer batteries tend to easily deform as compared with other types of batteries (typically batteries having metal cases). Thus, by a conventional peel-off method, the batteries would deform, sometimes resulting in functional failure. According to the PSA sheet disclosed herein, by means of the stretch removal (typically pull-out removal), while reducing deformation of polymer batteries, the PSA sheet can be removed properly.

PSA sheets used for fastening batteries in portable electronics cannot be often pulled in parallel with the shear direction during removal because of other components present around the batteries or because of where the batteries are, etc. In such a case, the PSA sheet is removed by pulling at an angle not in parallel with the adhesion face(s) (e.g. at an angle of 45° or larger, but 90° or smaller, typically at an angle of 70° or larger, but smaller than 90°). Because of these circumstances, during removal, the battery-fastening PSA sheet has been susceptible to damage upon contact with the adherend (battery) or an object in the way, leading to the likely occurrence of fracture. According to the art disclosed herein, even in such an embodiment of stretch removal, the PSA sheet having at least a certain level of tensile strength at break is less susceptible to damage; and therefore, excellent stretch removability can be realized.

Matters disclosed in this description include the following:
(1) A PSA sheet for portable electronics, with the PSA sheet exhibiting a shear adhesive strength of 0.5 MPa or greater, a tensile strength at break of 10 MPa or greater, and an elongation at break of 300% or greater.
(2) A PSA sheet for portable electronics, with the PSA sheet comprising a PSA layer and a film-like substrate supporting the PSA layer and exhibiting a shear adhesive strength of 0.5 MPa or greater, a tensile strength at break of 10 MPa or greater, and an elongation at break of 300% or greater.
(3) The PSA sheet according to (1) or (2) above, exhibiting a tensile recovery of 80% or greater when measured by the method described below.
[Measurement of Tensile Recovery]
A PSA sheet is subjected to a tensile test in which a designated segment of a length $L_0$ in the PSA sheet is stretched by 100%. After stretched by 100%, the PSA sheet is released. When the designated segment has a length $L_1$ at five minutes after released, the tensile recovery is determined by an equation: tensile recovery (%)=$L_0/L_1 \times 100$.
(4) The PSA sheet according to any of (1) to (3) above, comprising a film-like substrate, with the film-like substrate being a non-foam resin film substrate.
(5) The PSA sheet according to any of (1) to (4) above, comprising, as the PSA layer, a first PSA layer provided to a first face of the film-like substrate and a second PSA layer provided to a second face of the film-like substrate.
(6) The PSA sheet according to (5) above intended to be used for bonding two adherends, and being capable of being removed in such a way that it is pulled out of the interface between the two adherends.
(7) The PSA sheet according to any of (1) to (6) above provided with a tab.
(8) The PSA sheet according to any of (1) to (6) above used for fastening a battery.
(9) The PSA sheet according to any of (1) to (8) above wherein the tensile strength (MPa) at break is at least 10 times the shear adhesive strength (MPa).
(10) The PSA sheet according to any of (1) to (9) comprising a PSA layer, with the PSA layer comprising an acrylic polymer in an amount accounting for more than 50% by weight of polymers in the PSA layer, wherein
the acrylic polymer comprises, as a monomeric component, an alkyl (meth)acrylate represented by a formula (1):

$$CH_2=C(R^1)COOR^2 \quad (1)$$

(in the formula (1), $R^1$ is a hydrogen atom or a methyl group; $R^2$ is an acyclic alkyl group having 1 to 20 carbon atoms) at a ratio of 70% by weight or higher.
(11) The PSA sheet according to (10) above, wherein the acrylic polymer has a glass transition temperature of −70° C. to −40° C.
(12) The PSA sheet according to (10) or (11) above, wherein the acrylic polymer has a weight average molecular weight in a range of $20 \times 10^4$ to $150 \times 10^4$.
(13) The PSA sheet according to any of (10) to (12) above, wherein the alkyl (meth)acrylate is at least either n-butyl acrylate or 2-ethylhexyl acrylate.
(14) The PSA sheet according to any of (10) to (13) above, wherein the acrylic polymer further comprises a functional group-containing monomer as a monomeric component, wherein the functional group-containing monomer is at least one species selected from the group consisting of a carboxyl group-containing monomer, a hydroxyl group-containing monomer, an acid anhydride group-containing monomer, an amide group-containing monomer, an amino group-containing monomer, a keto group-containing monomer, a monomer having a nitrogen atom-containing ring, an alkoxysilyl group-containing monomer, an imide group-containing monomer, and an epoxy group-containing monomer.

(15) The PSA sheet according to (14) above, wherein the functional group-containing monomer is at least one species selected from the group consisting of acrylic acid, methacrylic acid, 2-hydroxyethyl (meth)acrylate, 2-hydroxypropyl (meth)acrylate, 3-hydroxypropyl (meth)acrylate, 2-hydroxybutyl (meth)acrylate, and 4-hydroxybutyl (meth)acrylate.

(16) The PSA sheet according to any of (10) to (15) above, wherein the PSA layer comprises a tackifier resin having a softening point of 100° C. or higher, with the tackifier resin comprising at least either a rosin-based tackifier resin or a terpene-based tackifier resin.

(17) The PSA sheet according to any of (10) to (16) above, wherein the PSA layer comprises 10 parts to 60 parts by weight of a tackifier to 100 parts by weight of the acrylic polymer.

(18) The PSA sheet according to any of (10) to (17) above, wherein the PSA layer comprises an acrylic oligomer.

(19) The PSA sheet according to any of (1) to (18) above exhibiting a tensile strength at break of 20 MPa or greater and an elongation at break of 500% or greater.

(20) The PSA sheet according to any of (1) to (19) above, comprising a film-like substrate, wherein the film-like substrate is a resin film substrate having an expansion rate below 1.1-fold.

(21) The PSA sheet according to any of (1) to (20) above comprising a film-like substrate, with the film-like substrate comprising at least one species of resin material selected from the group consisting of polyurethane, urethane (meth)acrylate-based polymer, polyolefin, polyester, and polyvinyl chloride.

(22) The PSA sheet according to any of (1) to (21) above comprising a film-like substrate, wherein the film-like substrate comprises 70% or more polyurethane by weight, and the polyurethane is an ether-based polyurethane, an ester-based polyurethane or a carbonate-based polyurethane.

(23) The PSA sheet according to any of (1) to (9) above, wherein the PSA layer is formed of a rubber-based PSA that comprises, as its base polymer, a block copolymer of a monovinyl-substituted aromatic compound and a conjugated diene compound.

(24) The PSA sheet according to (23) above, wherein the block copolymer has a diblock fraction of 30% by weight or higher.

(25) The PSA sheet according to (23) or (24) above, wherein the block copolymer is a styrene-based block copolymer with 5% to 40% styrene by weight.

(26) The PSA sheet according to one of (23) to (25) above, wherein the PSA layer comprises a high softening point resin having a softening point of 120° C. or higher and a low softening point resin having a softening point of lower than 120° C., with the high softening point resin comprising a terpene-phenol resin A having a hydroxyl value of 40 mg KOH/g or higher, and lower than 80 mg KOH/g as well as a terpene-phenol resin B having a hydroxyl value of 80 mg KOH/g or higher, and the low softening point resin being a terpene resin.

(27) A PSA sheet for portable electronics that comprises a PSA layer and a film-like substrate supporting the PSA layer and further comprises a tab, wherein the PSA sheet exhibits a shear adhesive strength of 1.0 MPa or greater, a tensile strength at break of 20 MPa or greater, and an elongation at break of 500% or greater, with the tensile strength (MPa) at break being at least 10 times the shear adhesive strength (MPa);

the PSA sheet exhibits a tensile recovery of 80% or greater, wherein the tensile recovery is determined as follows: the PSA sheet is subjected to a tensile test in which a designated segment of a length $L_0$ in the PSA sheet is stretched by 100%; when stretched by 100%, the PSA sheet is released; when the designated segment has a length $L_1$ at five minutes after released, the tensile recovery is determined by an equation: tensile recovery (%)=$L_0/L_1 \times 100$;

the PSA layer comprises an acrylic polymer in an amount accounting for more than 50% by weight of polymers in the PSA layer;

the acrylic polymer comprises, as a monomeric component, an alkyl (meth)acrylate represented by a formula (1):

$$CH_2=C(R^1)COOR^2 \qquad (1)$$

(in the formula (1), $R^1$ is a hydrogen atom or a methyl group; $R^2$ is an acyclic alkyl group having 1 to 20 carbon atoms) at a ratio of 70% by weight or higher;

the alkyl (meth)acrylate is at least either n-butyl acrylate or 2-ethylhexyl acrylate;

the acrylic polymer further comprises a functional group-containing monomer as a monomeric component;

the functional group-containing monomer is at least one species selected from the group consisting of acrylic acid, methacrylic acid, 2-hydroxyethyl (meth)acrylate, 2-hydroxypropyl (meth)acrylate, 3-hydroxypropyl (meth)acrylate, 2-hydroxybutyl (meth)acrylate, and 4-hydroxybutyl (meth)acrylate;

the acrylic polymer has a glass transition temperature of −70° C. to −40° C.;

the acrylic polymer has a weight average molecular weight in a range of $20 \times 10^4$ to $150 \times 10^4$;

the PSA layer comprises a tackifier resin having a softening point of 100° C. or higher;

the tackifier resin comprises at least either a rosin-based tackifier resin or a terpene-based tackifier resin;

the tackifier content in the PSA layer is 10 parts to 60 parts by weight to 100 parts by weight of the acrylic polymer;

the film-like substrate is a resin film substrate having an expansion rate below 1.1-fold;

the film-like substrate comprises 70% or more polyurethane by weight; and the polyurethane is an ether-based polyurethane, an ester-based polyurethane or a carbonate-based polyurethane.

Several worked examples relating to the present invention are described below, but the present invention is not intended to be limited to these examples. In the description below, "parts" and "%" are based on weight unless otherwise specified.

Example 1

Preparation of Acrylic PSA Composition

To a reaction vessel equipped with a stirrer, thermometer, nitrogen gas inlet, reflux condenser and addition funnel, were placed 100 parts of BA, 5 parts of VAc, 3 parts of AA and 0.1 part of HEA, 0.2 part of AIBN as a polymerization initiator and toluene as a polymerization solvent. Solution polymerization was carried out at 60° C. for 6 hours to obtain a toluene solution of an acrylic polymer. The Mw of the acrylic polymer was $55 \times 10^4$.

To 100 parts of the acrylic polymer in the toluene solution, were added the following to prepare an acrylic PSA composition: as tackifier resins, 10 parts of rosin-based resin A (polymerized rosin pentaerythritol ester, trade name HARI-TACK PCJ available from Harima Chemicals Group, Inc.; softening point 118° C. to 128° C.), 10 parts of rosin-based resin B (hydrogenated rosin glycerin ester, trade name HARITACK SE10 available from Harima Chemicals Group, Inc.; softening point 75° C. to 85° C.), 5 parts of rosin-based resin C (hydrogenated rosin methyl ester, trade name FORALYN 5020F, available from Eastman Chemical Company), and 15 parts of terpene-modified phenolic resin (trade name SUMILITE RESIN PR-12603N available from Sumitomo Bakelite Co., Ltd.) as well as 2 parts of an isocyanate-based crosslinking agent (trade name CORONATE L available from Nippon Polyurethane Industry Co., Ltd.) as a crosslinking agent.

(Preparation of Double-Faced PSA Sheet)

Were obtained two sheets of a commercial release liner (trade name "SLB-80W3D" available from Sumikakakoushi Co., Ltd.). To the respective first faces (release faces) of the release liners, the PSA composition was applied to a dry thicknesses of 25 μm and allowed to dry at 100° C. for two minutes. The respective PSA layers (first PSA layer and second PSA layer) were thus formed on the release faces of two release liners.

As a film-like substrate, a 100 μm thick non-foam ether-based polyurethane resin film was obtained. To the two faces of the film-like substrate, were adhered the respective PSA layers formed on the two sheets of release liner. The release liners were left as they were on the PSA layers to protect the surfaces (adhesive faces) of the PSA layers. The resulting structure was passed through a laminator at 80° C. (0.3 MPa, 0.5 m/min rate) once and then aged in an oven at 50° C. for one day. A double-faced PSA sheet according to Example 1 was thus obtained.

Example 2

As the film-like substrate, 30 μm thick non-foam ether-based polyurethane resin film was used. The first and second PSA layers were 10 μm thick each. Otherwise in the same manner as Example 1, a double-faced PSA sheet according to Example 2 was obtained.

Example 3

As the film-like substrate, 30 μm thick non-foam ether-based polyurethane resin film was used. The first and second PSA layers were 5 μm thick each. Otherwise in the same manner as Example 1, a double-faced PSA sheet according to Example 3 was obtained.

Example 4

As the film-like substrate, a 100 μm thick PE-based foam film substrate (expansion rate: 3-fold to 4-fold) having a corona discharge-treated surface was used. Otherwise in the same manner as Example 1, a double-faced PSA sheet according to Example 4 was obtained.

Example 5

As the film-like substrate, a 100 μm thick PE-based foam film substrate (expansion rate: 2-fold to 3-fold) having a corona discharge-treated surface was used. Otherwise in the same manner as Example 1, a double-faced PSA sheet according to Example 5 was obtained.

Example 6

As the film-like substrate, 75 μm thick PET film having a corona discharge-treated surface was used. The first and second PSA layers were 37.5 μm thick each. Otherwise in the same manner as Example 1, a double-faced PSA sheet according to Example 6 was obtained.

Example 7

As the film-like substrate, 100 μm thick PET film having a corona discharge-treated surface was used. The first and second PSA layers were 50 μm thick each. Otherwise in the same manner as Example 1, a double-faced PSA sheet according to Example 7 was obtained.

Example 8

As the film-like substrate, 60 μm thick non-foam ether-based polyurethane resin film was used. The first and second PSA layers were 20 μm thick each. Otherwise in the same manner as Example 1, a double-faced PSA sheet according to Example 8 was obtained.

Example 9

As the film-like substrate, 40 μm thick non-foam ether-based polyurethane resin film was used. Otherwise in the same manner as Example 8, a double-faced PSA sheet according to Example 9 was obtained.

Example 10

Preparation of Rubber-Based PSA Composition

Were mixed 100 parts of a styrene-isoprene block copolymer (product name QUINTAC 3520 available from Zeon Corporation, 78% diblock, 15% styrene), 40 parts of a terpene phenol resin, 30 parts of a terpene resin, 0.75 part (non-volatiles) of an isocyanate compound (trade name CORONATE L available from Nippon Polyurethane Industry Co., Ltd.) and toluene as a solvent; the mixture was stirred to prepare a rubber-based PSA composition at 50% NV. As the terpene phenol resin, two kinds were used at a weight ratio of 1:1 in a combined amount of 40 parts, namely YS POLYSTAR S145 (softening point 145° C., hydroxyl value 100 mg KOH/g) and trade name YS POLYSTAR T145 (softening point 145° C., hydroxyl value 60 mg KOH/g) both available from Yasuhara Chemical Co., Ltd. As the terpene resin, was used product name YS RESIN PX1150N (softening point 115° C., hydroxyl value below 1 mg KOH/g) available from Yasuhara Chemical Co., Ltd.

(Fabrication of Double-Faced PSA Sheet)

Two sheets of commercial release liner (trade name SLB-80W3D available from Sumikakakoushi Co., Ltd.) were obtained. To one face (release face) of each of these release liner sheets, the PSA composition was applied to a thickness of 45 μm after dried and allowed to dry at 100° C. for two minutes. PSA layers (the first and second PSA layers) were thus formed on the respective release faces of the two release liner sheets.

As the film-like substrate, was obtained 60 μm thick non-foam ether-based polyurethane resin film. To the two faces of this film-like substrate, the PSA layers formed on the two release liner sheets were adhered, respectively. The release liners were left as they were on the PSA layers and used to protect the PSA layer surfaces (adhesive surfaces). The resulting structure was passed through a laminator at 80° C. (0.3 MPa, 0.5 m/min speed) once and then aged in an oven at 50° C. for one day. A double-faced PSA sheet according to Example 10 was thus obtained.

The double-faced PSA sheets of Examples 1 to 10 were measured for shear adhesive strength (MPa), tensile strength at break (MPa), elongation at break (%), 100% modulus (MPa) and tensile recovery (%). The results are shown in Table 1.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Substrate material | PU | PU | PU | PE foam | PE foam | PET | PET | PU | PU | PU |
| Substrate thickness (μm) | 100 | 30 | 30 | 100 | 100 | 75 | 100 | 60 | 40 | 60 |
| Overall thickness of PSA sheet (μm) | 150 | 50 | 40 | 150 | 150 | 150 | 200 | 100 | 80 | 150 |
| Shear adhesive strength (MPa) | 1.3 | 1.2 | 1.0 | 1.2 | 1.2 | 1.1 | 1.1 | 1.3 | 1.3 | 1.0 |
| Tensile strength at break (MPa) | 64 | 64 | 75 | 5 | 9 | 83 | 81 | 24 | 38 | 28 |
| Elongation at break (%) | 802 | 800 | 855 | 694 | 652 | 179 | 288 | 710 | 920 | 820 |
| 100% modulus (MPa) | 8.1 | 8.0 | 7.5 | 1.1 | 3.0 | 70 | 68 | 3.5 | 3.3 | 3.0 |
| Tensile recovery (%) | 95 | 95 | 95 | 63 | 65 | 50 | 50 | 92 | 92 | 90 |

PU: polyurethane

As shown in Table 1, the PSA sheets according to Examples 1 to 3 and Examples 8 to 10 exhibited shear adhesive strength of 0.5 MPa or greater, tensile strength at break of 10 MPa or greater, and elongation at break of 300% or greater. From this, it is presumed that the PSA sheets according to these examples adhere well to adherends when applied and can be removed well from the adherends without damage caused by the pulling when removed. On the other hand, the PSA sheets according to Examples 4 and 5 showed tensile strength at break of less than 10 MPa. Thus, it is presumed that when the PSA sheets are stretch-removed, damage such as tearing is likely to occur. The PSA sheets according to Examples 6 and 7 showed elongation at break below 300%. Accordingly, when the PSA sheets are removed, presumably, their deformation will cause little release effect and they do not show great stretch removability.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST

1 PSA sheet
10 film-like substrate
21, 22 PSA layers
31 release liner

The invention claimed is:

1. A pressure-sensitive adhesive sheet for portable electronics, with the pressure-sensitive adhesive sheet exhibiting a shear adhesive strength of 0.5 MPa or greater, a tensile strength at break of 10 MPa or greater, an elongation at break of 500% or greater, and a tensile recovery of 50% or greater when measured by the following method for measuring the tensile recovery:

the pressure-sensitive adhesive sheet is subjected to a tensile test in which a designated segment of a length $L_0$ in the pressure-sensitive adhesive sheet is stretched by 100%; when stretched by 100%, the pressure-sensitive adhesive sheet is released; when the designated segment has a length $L_1$ at five minutes after released, the tensile recovery is determined by an equation: tensile recovery (%)=$L_0/L_1 \times 100$.

2. The pressure-sensitive adhesive sheet for portable electronics according to claim 1, wherein the pressure-sensitive adhesive sheet comprises a pressure-sensitive adhesive layer and a substrate film supporting the pressure-sensitive adhesive layer.

3. The pressure-sensitive adhesive sheet according to claim 2, comprising, as the pressure-sensitive adhesive layer, a first pressure-sensitive adhesive layer placed on a first face of the substrate film and a second pressure-sensitive adhesive layer placed on a second face of the substrate film with the first pressure-sensitive adhesive layer having a thickness of 3 μm to 200 μm, the second pressure-sensitive adhesive layer having a thickness of 3 μm to 200 μm, and the first and second pressure-sensitive adhesive layers may be different in thickness.

4. The pressure-sensitive adhesive sheet according to claim 1 -exhibiting a tensile recovery of 80% or greater.

5. The pressure-sensitive adhesive sheet according to claim 1 provided with a tab.

6. The pressure-sensitive adhesive sheet according to claim 1 comprising a pressure-sensitive adhesive layer, wherein the pressure-sensitive adhesive layer comprises an acrylic polymer in an amount accounting for more than 50% by weight of polymers in the pressure-sensitive adhesive layer, the acrylic polymer comprises, as a monomeric component, an alkyl (meth)acrylate represented by a formula (1):

$$CH_2=C(R^1)COOR^2 \qquad (1)$$

in which $R^1$ is a hydrogen atom or a methyl group; $R^2$ is an acyclic alkyl group having 1 to 20 carbon atoms, and the alkyl (meth)acrylate is present in an amount of 70% by weight or higher.

7. The pressure-sensitive adhesive sheet according to claim 6, wherein the alkyl (meth)acrylate comprises either n-butyl acrylate or 2-ethylhexyl acrylate.

8. The pressure-sensitive adhesive sheet according to claim 6, wherein the acrylic polymer further comprises a functional group-containing monomer as a monomeric component, wherein the functional group-containing monomer is at least one species selected from the group consisting of a carboxyl group-containing monomer, a hydroxyl group-containing monomer, an acid anhydride group-containing monomer, an amide group-containing monomer, an amino group-containing monomer, a keto group-containing monomer, a monomer having a nitrogen atom-containing ring, an alkoxysilyl group-containing monomer, an imide group-containing monomer, and an epoxy group-containing monomer.

9. The pressure-sensitive adhesive sheet according to claim 6, wherein the pressure-sensitive adhesive layer comprises a tackifier resin having a softening point of 100° C. or higher, with the tackifier resin comprising at least either a rosin-based tackifier resin or a terpene-based tackifier resin.

10. The pressure-sensitive adhesive sheet according to claim 6, wherein the pressure-sensitive adhesive layer comprises 10 parts to 60 parts by weight of a tackifier to 100 parts by weight of the acrylic polymer.

11. The pressure-sensitive adhesive sheet according to claim 6, wherein a pressure-sensitive adhesive composition forming the pressure-sensitive adhesive layer comprises at least one species of crosslinking agent selected from the group consisting of an isocyanate-based crosslinking agent, epoxy-based crosslinking agent, oxazoline-based crosslinking agent, aziridine-based crosslinking agent, melamine-based crosslinking agent, peroxide-based crosslinking agent, and metal chelate-based crosslinking agent.

12. The pressure-sensitive adhesive sheet according to claim 1 comprising a substrate film, wherein
the substrate film comprises an urethane (meth)acrylate-based polymer.

13. The pressure-sensitive adhesive sheet according to claim 1 comprising a substrate film, wherein the substrate film comprises 70% or more polyurethane by weight, and the polyurethane is an ether-based polyurethane, an ester-based polyurethane or a carbonate-based polyurethane.

14. The pressure-sensitive adhesive sheet according to claim 1, comprising a pressure-sensitive adhesive layer, wherein the pressure-sensitive adhesive layer is formed of a rubber-based pressure-sensitive adhesive that comprises a base polymer which is a block copolymer of a monovinyl-substituted aromatic compound and a conjugated diene compound.

15. The pressure-sensitive adhesive sheet according to claim 14, wherein the block copolymer has a diblock fraction of 30% by weight or higher.

16. The pressure-sensitive adhesive sheet according to claim 14, wherein the block copolymer is a styrene-based block copolymer including 5% to 40% by weight of styrene.

17. The pressure-sensitive adhesive sheet according to claim 14, wherein the pressure-sensitive adhesive layer comprises:
a high softening point resin having a softening point of 120° C. or higher; and
a low softening point resin having a softening point of lower than 120° C.,
the high softening point resin comprises:
a terpene-phenol resin A having a hydroxyl value of 40 mg KOH/g or higher, and lower than 80 mg KOH/g; and
a terpene-phenol resin B having a hydroxyl value of 80 mg KOH/g or higher, and the low softening point resin comprises a terpene resin.

18. A pressure-sensitive adhesive sheet for portable electronics, the pressure-sensitive adhesive sheet comprising:
a pressure-sensitive adhesive layer;
a substrate film supporting the pressure-sensitive adhesive layer; and
a tab, wherein the pressure-sensitive adhesive sheet exhibits a shear adhesive strength of 1.0 MPa or greater, a tensile strength at break of 20 MPa or greater, and an elongation at break of 500% or greater, with the tensile strength (MPa) at break being at least 10 times the shear adhesive strength (MPa);
the pressure-sensitive adhesive sheet exhibits a tensile recovery of 80% or greater, wherein the tensile recovery is determined as follows: the pressure-sensitive adhesive sheet is subjected to a tensile test in which a designated segment of a length $L_0$ in the pressure-sensitive adhesive sheet is stretched by 100%; when stretched by 100%, the pressure-sensitive adhesive sheet is released; when the designated segment has a length $L_1$ at five minutes after released, the tensile recovery is determined by an equation: tensile recovery (%)=$L_0/L_1 \times 100$;
the pressure-sensitive adhesive layer comprises an acrylic polymer in an amount accounting for more than 50% by weight of polymers in the pressure-sensitive adhesive layer;
the acrylic polymer comprises, as a monomeric component, an alkyl (meth)acrylate represented by a formula (1):

$$CH_2=C(R^1)COOR^2 \tag{1}$$

in which $R^1$ is a hydrogen atom or a methyl group; $R^2$ is an acyclic alkyl group having 1 to 20 carbon atoms, and the alkyl (meth)acrylate is present in an amount of 70% by weight or higher;
the alkyl (meth)acrylate comprises either n-butyl acrylate or 2-ethylhexyl acrylate;
the acrylic polymer further comprises a functional group-containing monomer as a monomeric component;
the functional group-containing monomer comprises at least one species selected from the group consisting of acrylic acid, methacrylic acid, 2-hydroxyethyl (meth)acrylate, 2-hydroxypropyl (meth)acrylate, 3-hydroxypropyl (meth)acrylate, 2-hydroxybutyl (meth)acrylate, and 4-hydroxybutyl (meth)acrylate;
the acrylic polymer has a glass transition temperature of −70° C. to −40° C.;
the acrylic polymer has a weight average molecular weight in a range of $20 \times 10^4$ to $150 \times 10^4$;
the pressure-sensitive adhesive layer comprises a tackifier resin having a softening point of 100° C. or higher;
the tackifier resin comprises either a rosin-based tackifier resin or a terpene-based tackifier resin;
the tackifier content in the pressure-sensitive adhesive layer is 10 parts to 60 parts by weight to 100 parts by weight of the acrylic polymer;
the substrate film is a resin film substrate having an expansion rate below 1.1-fold;
the substrate film comprises polyurethane in an amount of 70% by weight or more; and
the polyurethane is an ether-based polyurethane, an ester-based polyurethane or a carbonate-based polyurethane.

* * * * *